(12) United States Patent
Ahn et al.

(10) Patent No.: US 10,151,943 B2
(45) Date of Patent: Dec. 11, 2018

(54) IRREGULAR SHAPE DISPLAY DEVICE HAVING HOLE

(71) Applicant: LG Display Co., Ltd., Seoul (KR)

(72) Inventors: Seunghyun Ahn, Seokjeok-eup (KR); Miok Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/280,726

(22) Filed: Sep. 29, 2016

(65) Prior Publication Data

US 2017/0153486 A1 Jun. 1, 2017

(30) Foreign Application Priority Data

Nov. 30, 2015 (KR) .................. 10-2015-0169205

(51) Int. Cl.
*G02F 1/1333* (2006.01)
*F21V 8/00* (2006.01)
(Continued)

(52) U.S. Cl.
CPC ........ *G02F 1/133308* (2013.01); *B60K 37/02* (2013.01); *G02B 6/005* (2013.01); *G02B 6/0088* (2013.01); *G02F 1/1339* (2013.01); *G04G 17/045* (2013.01); *B60K 2350/106* (2013.01); *B60K 2350/1064* (2013.01); *B60K 2350/408* (2013.01); *G02B 6/0055* (2013.01); *G02F 1/137* (2013.01); *G02F 1/1368* (2013.01); *G02F 1/13439* (2013.01); *G02F 1/133514* (2013.01); *G02F 1/133615* (2013.01); *G02F 1/136286* (2013.01); *G02F 2001/133314* (2013.01); *G02F 2001/133317* (2013.01); *G02F 2001/133322* (2013.01); *G02F 2201/121* (2013.01); *G02F 2201/123* (2013.01); *G02F 2201/46* (2013.01);
(Continued)

(58) Field of Classification Search
CPC .................................................. G02F 1/133308
See application file for complete search history.

(56) References Cited

U.S. PATENT DOCUMENTS 5,881,024 A 3/1999 Nishimura et al.
6,276,809 B1 8/2001 Matsumoto
(Continued)

FOREIGN PATENT DOCUMENTS

JP 2003-167241 A 6/2003
JP 2010-139657 A 6/2010
(Continued)

OTHER PUBLICATIONS

Office Action dated Mar. 16, 2017 in the corresponding GB Patent Application No. 1620265.7.
(Continued)

*Primary Examiner* — Edmond Lau
(74) *Attorney, Agent, or Firm* — Polsinelli PC

(57) ABSTRACT

An irregular shape display having a hole according to the present disclosure may insert a cylinder-shaped guide member with the same material as that of a light guide plate within a hole to reduce a luminance difference between the front and the back of the hole, thereby improving a dark portion in the vicinity of the hole.
Furthermore, the present disclosure may attach a reflection sheet to an upper portion of the guide member to block light leaked out between the light guide plate and the guide member.

22 Claims, 10 Drawing Sheets

(51) Int. Cl.
    *G02F 1/1339*     (2006.01)
    *B60K 37/02*     (2006.01)
    *G04G 17/04*     (2006.01)
    *G02F 1/1335*     (2006.01)
    *G02F 1/1343*     (2006.01)
    *G02F 1/1362*     (2006.01)
    *G02F 1/1368*     (2006.01)
    *G02F 1/137*     (2006.01)

(52) U.S. Cl.
    CPC ...... *G02F 2201/56* (2013.01); *G02F 2202/28* (2013.01)

(56) References Cited

U.S. PATENT DOCUMENTS

| | | |
|---|---|---|
| 2003/0112712 A1 | 6/2003 | Ferri et al. |
| 2008/0123178 A1* | 5/2008 | Uchida ................ G02F 1/1313 359/296 |
| 2010/0064961 A1* | 3/2010 | Masuda ................ G01D 11/28 116/286 |
| 2011/0205464 A1* | 8/2011 | Kim .................. G02F 1/133608 349/64 |
| 2012/0327325 A1 | 12/2012 | Park et al. |
| 2013/0308342 A1* | 11/2013 | Gu .......................... G09F 13/04 362/613 |
| 2014/0293141 A1* | 10/2014 | Tsubokura ........ G02F 1/133308 349/1 |
| 2017/0059771 A1* | 3/2017 | Yuki ................ G02F 1/133615 |
| 2017/0090113 A1* | 3/2017 | Yuki .................... G02B 6/0088 |

FOREIGN PATENT DOCUMENTS

| | | |
|---|---|---|
| JP | 4939893 B2 | 5/2012 |
| JP | 2014-142612 A | 8/2014 |
| JP | 2014-191114 A | 10/2014 |

OTHER PUBLICATIONS

Office Action dated Oct. 5, 2017 in the corresponding Taiwanese Patent Application No. 105137111.

* cited by examiner

| HOLE RADIUS (mm) | DIFFERENCE BETWEEN FRONT AND BACK OF HOLE | | DIFFERENCE |
| --- | --- | --- | --- |
| | COMPARISON EXAPLE | EMBODIMENT | |
| 1 | 646 | 647 | 1 |
| 2 | 941 | 907 | −37 |
| 3 | 1289 | 1111 | −178 |
| 4 | 1588 | 1295 | −293 |
| 5 | 1786 | 1377 | −409 |
| 6 | 1906 | 1386 | −523 |
| 7 | 1907 | 1287 | −620 |
| 8 | 1904 | 1307 | −597 |

IRREGULAR SHAPE DISPLAY DEVICE HAVING HOLE

CROSS-REFERENCE TO RELATED APPLICATIONS

This application claims the benefit of Korean Patent Application No. 10-2015-0169205, filed in the Republic of Korea on Nov. 30, 2015, which is hereby incorporated by reference in its entirety.

BACKGROUND

Field of the Disclosure

The present disclosure relates to a display device, and more particularly, to an irregular shape display (or non-tetragonal shaped display) having a hole.

Description of the Background

In recent information society, the importance of display (or display devices) is more emphasized as a visual information transmission medium, but their requirements such as low power consumption, thin profile, light weight, high picture quality should be satisfied in order to take the principal position in the future.

Display devices can be divided into an emissive type display capable of spontaneously emitting light such as cathode ray tube (CRT), electro luminescence (EL), light emitting diode (LED), vacuum fluorescent display (VFD), field emission display (FED), plasma display panel (PDP), and the like, and a non-emissive type display incapable of spontaneously emitting light such as liquid crystal display (LCD) device.

The liquid crystal display is a device for implementing images using optical anisotropy of liquid crystal molecules, and in recent years, it has been mostly used as a device along with a PDP display because its visibility is more excellent than a CRT, and its average power consumption and heat dissipation is lower than that of CRT with the same screen size.

Hereinafter, a typical liquid crystal display device will be described in detail.

In general, a liquid crystal display device may individually supply a data signal according to image information to pixels arranged in a matrix form and adjust the light transmittance of the pixels to display a desired image.

Accordingly, the liquid crystal display (LCD) include a liquid crystal panel in which pixels are arranged in a matrix form, and a drive unit for driving pixels and a backlight unit for supplying light to the liquid crystal panel.

FIG. 1 is an exploded perspective view schematically illustrating the structure of a typical liquid crystal display device.

Referring to FIG. 1, a typical liquid crystal display device may include a liquid crystal panel 10 in which pixels are arranged in a matrix form to display an image, and a drive unit (not shown) for driving pixels, a backlight unit 40 provided on a rear surface of the liquid crystal panel 10 to emit light over the entire surface of the liquid crystal panel 10, and a lower cover 50 for accommodating and fixing the liquid crystal panel 10 and backlight unit 40.

The liquid crystal panel 10 includes a color filter substrate 5 bonded thereto to maintain a uniform cell gap to face each other, an array substrate 15, and a liquid crystal layer (not shown) formed in a cell gap between the color filter substrate 5 and array substrate 15.

Upper and lower polarizers (not shown) are respectively adhered to an outer side of the liquid crystal panel 10, wherein the lower polarizer polarizes light passed through the backlight unit 40, and the upper polarizer polarizes light passed through the liquid crystal panel 10.

Describing the backlight unit 40 in detail, a light emitting diode (LED) assembly 30 for emitting light is provided at one side of a light guide plate 42, and a reflector 41 is provided on a rear surface of the light guide plate 42.

Here, the LED assembly 30 includes an LED array 31, an LED array printed circuit board (PCB) (not shown) for driving the LED array 31, and a housing 32.

Light emitted from the LED array 31 is entered to a lateral surface of the light guide plate 42 having a transparent material, and the reflector 41, and the reflector 41 disposed on a rear surface of the light guide plate 42 reflects light transmitted through the rear surface of the light guide plate 42 to the side of optical sheets on the upper surface of the light guide plate 42 to reduce the loss of light and enhance the uniformity.

The liquid crystal panel 10 consisting of the color filter substrate 5 and array substrate 15 is mounted on an upper portion of the backlight unit 40 having the foregoing configuration through a guide panel 45, and the lower cover 50 is coupled to a lower portion thereof to constitute a liquid crystal display device.

Though not shown in the drawing in detail, the liquid crystal panel 10 is mounted on the guide panel 45 through an adhesive tape, and the lower cover 50 is coupled to a fastening portion on a lateral surface of the guide panel 45 through a hook at an outer side thereof.

Here, a product with a circular shape out of the existing rectangular design may be referred to as an irregular shape display, and the different form has the meaning that the property, shape, type of things are different from the existing things. In other words, a irregular shape display refers to as a display having a shape of which is modified in various ways such as a circular or diamond shape out of the existing or traditional rectangular display.

Since the irregular shape display is fabricated in various shapes contrary to the existing rectangular display, and the fabrication process thereof is important. Furthermore, a very thin bezel that is capable of satisfying user's convenience as well as trendier and slimmer than the conventional products is necessary.

Here, when the guide panel 45 formed of a mold is applied thereto, a molding thickness of at least 0.6-0.8 mm is required, and thus restrictive in applying a narrow bezel structure less than 1.5 mm.

Furthermore, the molding and dimensional design error is more restrictive in a structure to which the foregoing hook 51 is applied to an outer side of the lower cover 50 or the hook is applied to an inner side of the guide panel 45.

In addition, as displays are widely used in various fields while increasing the usage thereof in recent years, the development of displays according to their application fields is required. For an example, a case where one or more holes for allowing mechanical parts in wearable watch such as a second hand, a minute hand, an hour hand or the like to pass therethrough are provided within a screen area of a display should be taken into consideration. In this case, a luminance difference between the front and the back of the hole should be also taken into consideration.

SUMMARY

The present disclosure is contrived to solve the aforementioned problem and an object of the invention is to provide a irregular shape display having one or more holes within a screen area of a display.

Another object of the invention is to provide a different type of display having a hole for improving a dark portion in the vicinity of the hole.

Other objects and features of the present disclosure will be described in the configuration of the invention and claims which follow herein below.

In order to accomplish the foregoing object, an irregular shape display according to an embodiment of the present disclosure may include a backlight unit located at a lower portion of a liquid crystal panel, a lower cover configured to accommodate the liquid crystal panel and the backlight unit, at least one hole provided in a predetermined region of the liquid crystal panel and the lower cover to allow a mechanical part to pass therethrough, and a cylinder-shaped guide member inserted into the hole.

Here, the backlight unit may include a light source located at one side of a light guide plate to generate light, a reflector disposed on a rear surface of the light guide plate, and optical sheets disposed on an upper surface of the light guide plate.

Here, an outside of the liquid crystal panel, the optical sheets, the light guide plate, the reflector and the lower cover may have a curved shape or polygonal shape or a mixed shape of a curve and a polygon.

The guide member may be formed of the same material as that of the light guide plate, and inserted into the hole to transmit light to a rear portion of the hole based on the light source The hole may include a first hole provided on the liquid crystal panel, second holes provided on the optical sheets, a third hole provided on the light guide plate, a fourth hole provided on the reflector, and a fifth hole provided on the lower cover.

Here, the first through the fifth hole may have a curved shape or polygonal shape or have a mixed shape of a curve and a polygon.

The first hole may have a diameter larger than that of the second holes, the third hole and the fourth hole, and the second holes, the third hole and the fourth hole may have a diameter larger than that of the fifth hole.

The guide member may be located at an upper edge portion of the lower cover around the fifth hole through the second holes, the third hole and the fourth hole.

The irregular shape display may further include a disk-shaped reflection sheet disposed on the guide member.

The reflection sheet may be configured with a multi-layered film coated with a metallic material, silver or aluminum with a high reflectivity.

The reflection sheet may be placed at an upper edge portion of the optical sheets around the second holes by interposing a pad therebetween.

Here, an external diameter of the reflection sheet may be relatively larger than that of the guide member, and overlap with an edge of the optical sheets around the second holes, and the pad may be located on the overlapping portion.

A diameter of the first hole may be smaller than an external diameter of the reflection sheet such that the liquid crystal panel is mounted on the reflection sheet.

The lower cover may include a protruding portion protruded in a direction of the liquid crystal panel from an edge of the fifth hole, and the guide member inserted through the second holes, the third hole and the fourth holes may be fastened to the protruding portion.

As described above, an irregular shape display having a hole according to an embodiment of the present disclosure may reduce a luminance difference between the front and the back of the hole, thereby improving a dark portion around the hole as well as blocking light leaked out between the light guide plate and the guide member.

Accordingly, the present disclosure provides an effect of enhancing image quality.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE INVENTION

Figure 1:
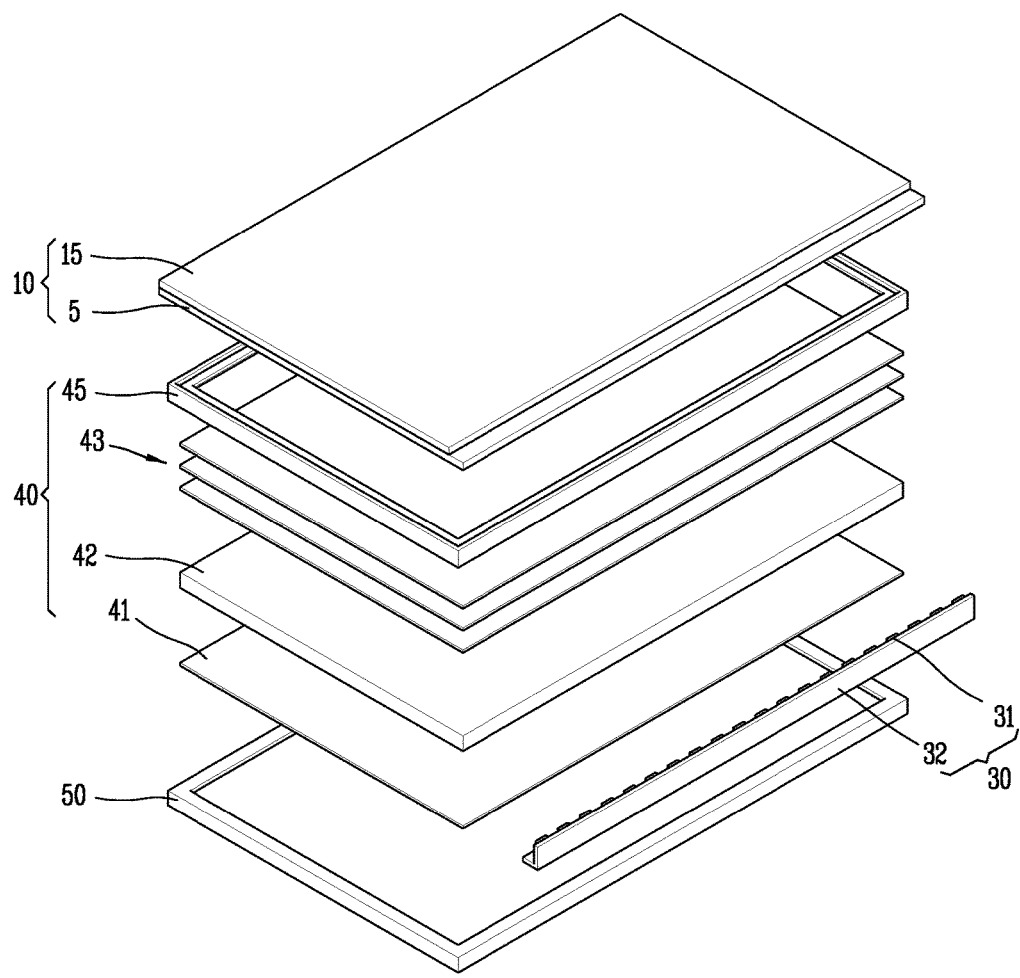
FIG. 1 is an exploded perspective view schematically illustrating the structure of a typical liquid crystal display device.

Hereinafter, preferred embodiments of the present disclosure will be described in detail with reference to the accompanying drawings to such an extent that the present disclosure can be easily embodied by a person having ordinary skill in the art to which the present disclosure pertains.

Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure and also to allow those skilled in the art to know the full range of the disclosure, and therefore, the present disclosure is to be defined only by the scope of the appended claims. Further, like reference numerals refer to like or similar elements throughout the specification. In the drawings, the size and relative size of layers and regions may be exaggerated for the clarity of the description.

An element or layer referred to as being "on" another element or layer may include both a case where it is directly on another element or layer and a case where another element and layer is interposed therebetween. On the contrary, an element referred to as being "directly on" another element indicates a case where another element and layer is not interposed therebetween.

Spatially relative terms such as "below", "beneath", "lower", "above", or "upper" may be used herein to describe a correlation between one device or constituent element and other devices or constituent elements as illustrated in the drawings. It will be understood that spatially relative terms are intended to include a different direction of device during the use or operation in addition to its direction illustrated in the drawings. For example, when a device in the drawing is turned over, the device described as "below" or "beneath" another device will be placed "above" the another device. Accordingly, the exemplary terms "below" or "beneath" may include both directions of above and below. Since the device may be oriented in another direction, and thus the spatially relative terms may be interpreted in accordance with the orientation thereof.

It should be noted that the terms used herein are merely used to describe the embodiments, but not to limit the present disclosure. In the present specification, unless clearly used otherwise, expressions in a singular form include a plural form. The term "comprises" and/or "comprising" used in the specification intend to express a constituent element, a step, an operation and/or a device does not exclude the existence or addition of one or more other constituent elements, steps, operations and/or devices.

Figure 2:
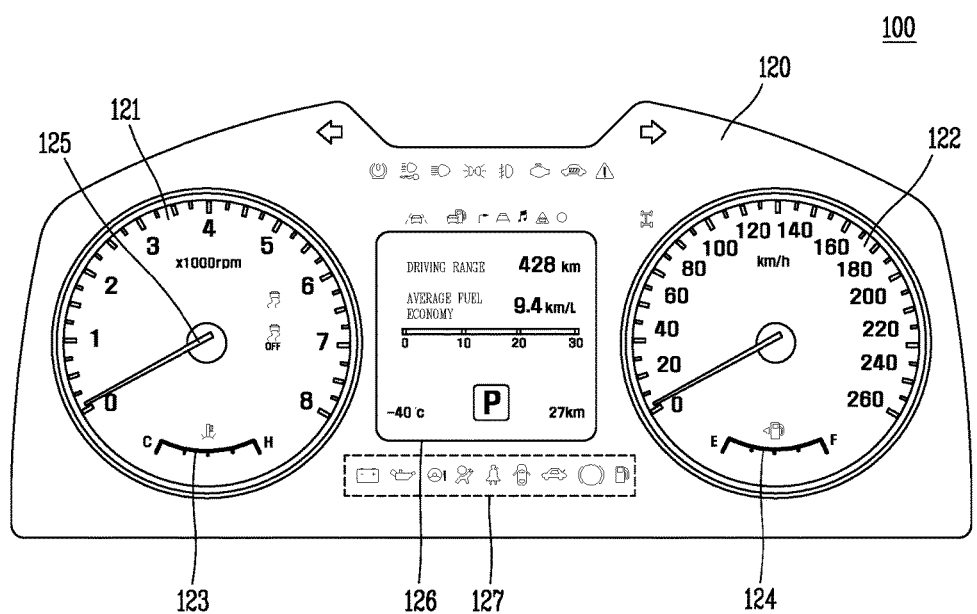
FIG. 2 is a plan view illustrating an irregular shape display according to a first embodiment of the present disclosure for an example.

FIG. 2 is a plan view illustrating an irregular shape display according to a first embodiment of the present disclosure for an example.

Figure 3:
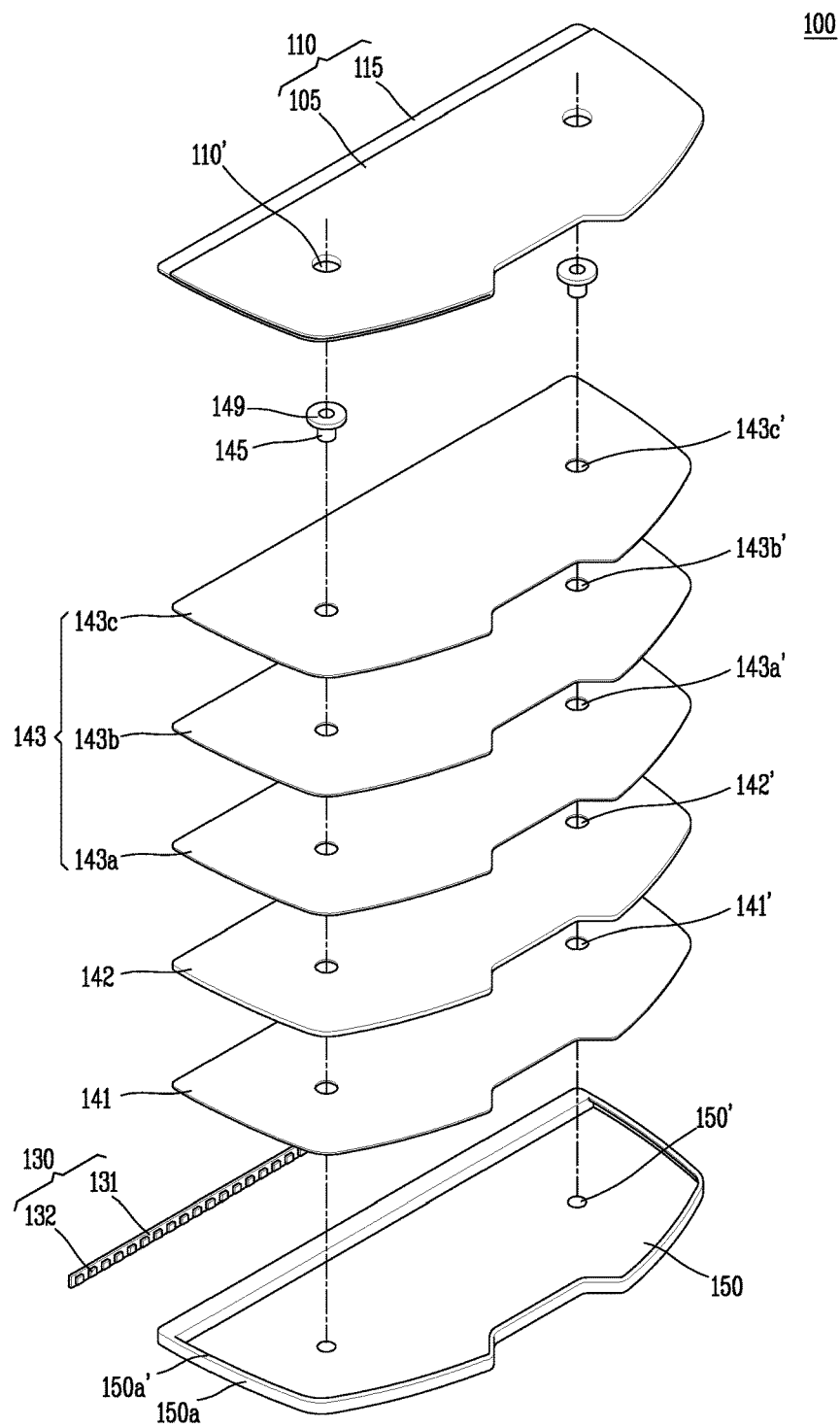
FIG. 3 is an exploded perspective view schematically illustrating the structure of the irregular shape display according to the first embodiment of the present disclosure illustrated in FIG. 2.

FIG. 3 is an exploded perspective view schematically illustrating the structure of the irregular shape display according to the first embodiment of the present disclosure illustrated in FIG. 2.

Figure 4:
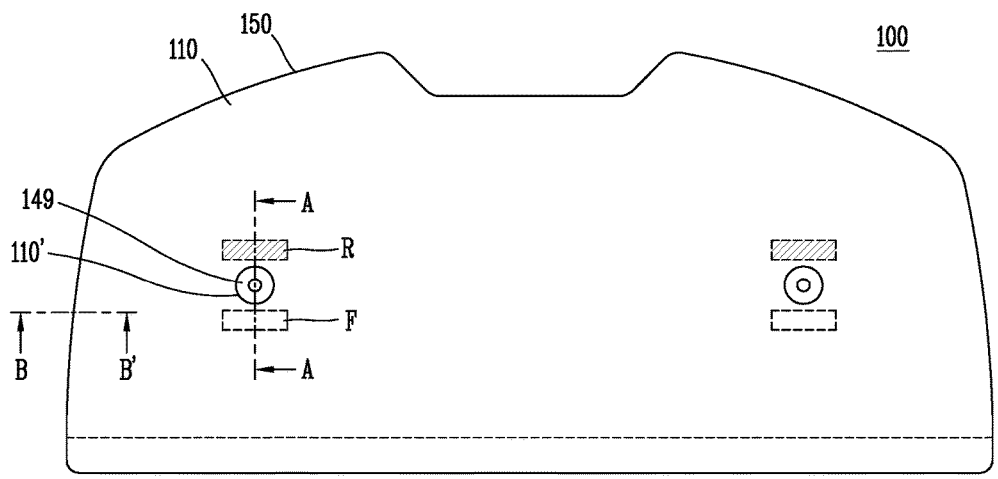
FIG. 4 is a view schematically illustrating the planar structure of a low cover in the irregular shape display according to the first embodiment of the present disclosure illustrated in FIG. 2.

FIG. 4 is a view schematically illustrating the planar structure of a low cover in the irregular shape display according to the first embodiment of the present disclosure illustrated in FIG. 2.

Figure 5:
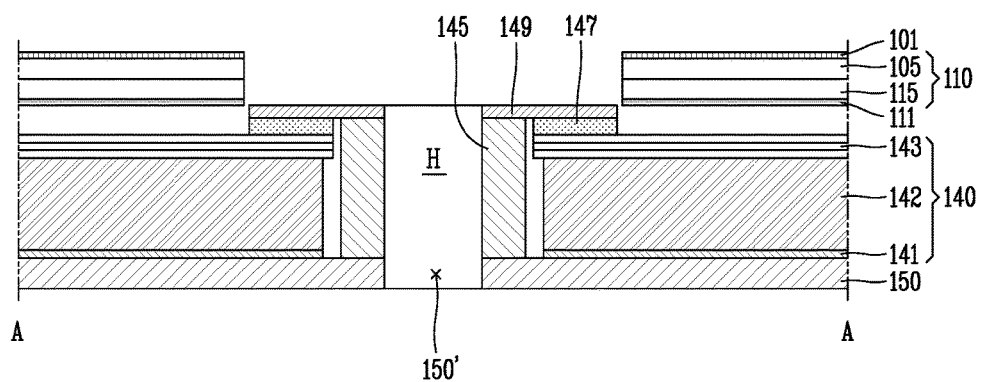
FIG. 5 is a view schematically illustrating a cross-section taken along line A-A' in the irregular shape display according to the first embodiment of the present disclosure illustrated in FIG. 4.
Figure 6:
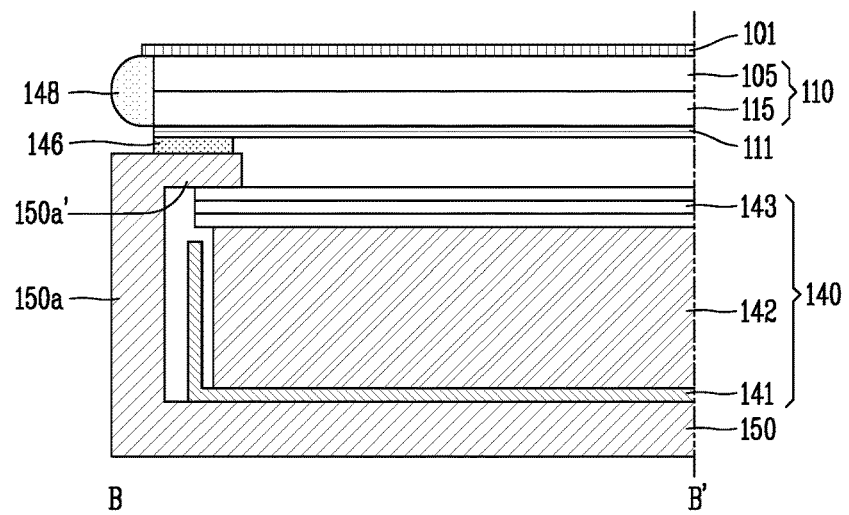
FIG. 6 is a view schematically illustrating a cross-section taken along line B-B' in the irregular shape display according to the first embodiment of the present disclosure illustrated in FIG. 4.

FIG. 5 is a view schematically illustrating a cross-section taken along line A-A' in the irregular shape display according to the first embodiment of the present disclosure illustrated in FIG. 4, and FIG. 6 is a view schematically illustrating a cross-section taken along line B-B' in the irregular shape display according to the first embodiment of the present disclosure illustrated in FIG. 4. In other words, FIG. 5 illustrates a cross-section around a hole as an example, and FIG. 6 illustrates a cross-section of an edge portion of the hole as an example.

Figure 7:
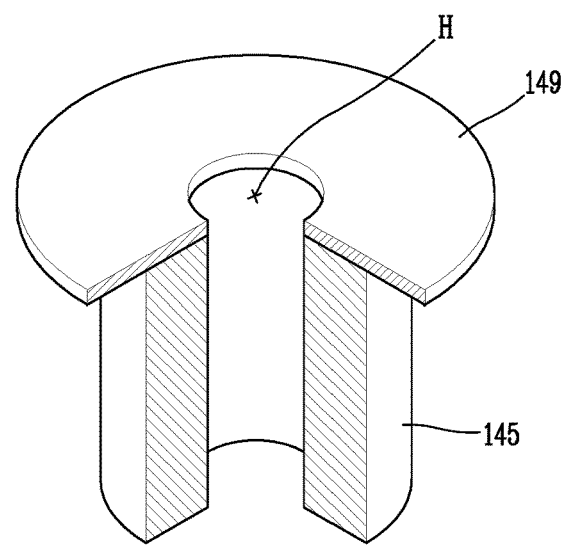
FIG. 7 is a perspective view schematically illustrating the structure of a guide member in the irregular shape display according to the first embodiment of the present disclosure.

Furthermore, FIG. 7 is a perspective view schematically illustrating the structure of a guide member in the irregular shape display according to the first embodiment of the present disclosure;

An irregular shape display referred to in the present disclosure may refer to as a display having a shape of which is modified in various ways such as a circular, diamond or elliptical shape out of the existing rectangular display or mixed with various shapes, and an irregular shape display according to the present disclosure may apply a narrow bezel structure less than 1.5 mm to satisfy user's convenience.

Furthermore, the present disclosure may include one or more holes capable of allowing a mechanical part such as a physical button, an indicator hand on a second hand, a minute hand, and an hour hand, a needle (pointer) of an instrument panel, and the like to pass therethrough within a screen area of such an irregular shape display.

However, the present disclosure may not exclude the existing rectangular display, and may be also applicable to a case where one or more holes are provided within a screen area of a rectangular display. In other words, a display according to the present disclosure may have a curved shape such as a circular or elliptical shape or a polygonal shape such as a rectangular or diamond shape or may have a mixed shape with various shapes.

The hole may also have a curved shape such as a circular or elliptical shape or a polygonal shape such as a rectangular or diamond shape or may have a mixed shape with various shapes.

Here, a vehicle dashboard is taken as an example for an irregular shape display according to a first embodiment of the present disclosure illustrated in FIGS. 2 through 7, but the present disclosure may not be necessarily limited to this.

Referring to FIG. 2, a vehicle dashboard 100 referred to as a cluster gauge is a dashboard for notifying a driver of the overall driving status of a vehicle, wherein the driver looks at the vehicle dashboard from time to time while keeping his or her eyes forward to determine the driving status.

An irregular shape display according to a first embodiment of the present disclosure, namely, the vehicle dashboard 100 may include a tachometer 121, a speedometer 122, a coolant temperature gauge 123, an oil gauge 124, and the like, and exhibit an engine rotation speed of the vehicle, a speed of the vehicle, coolant temperature and oil condition information sensed through sensors (not shown) through a change of movement of a needle (pointer) 125.

Here, for an example, the tachometer 121 may be located at the left side of the vehicle dashboard 100, and indicate an engine rotation speed, namely, revolution per minute (RPM), by the needle 125.

The speedometer 122 may be located at the right side of the vehicle dashboard 100, and indicate the speed of the vehicle by the needle 125.

As a result, a driver may read a number indicated by the needle 125 to obtain the status information of the vehicle during driving and refer to the information to take an action such as adjusting the speed while driving the vehicle or the like.

In other words, while driving the vehicle, the driver may check the speedometer 122 to recognize the speed of the vehicle during driving, and recognize a revolution per minute of the engine through the tachometer 121.

Furthermore, when the remaining amount of fuel is reduced to be less than a set value, the oil gauge 124 may turn on a warning lamp to allow a driver to recognize a fuelling time.

The coolant temperature gauge 123 may allow a driver to recognize the coolant temperature of the engine to prevent malfunctions and damages due to overheating.

As described above, a scale is displayed on a gauge such as the tachometer 121, the speedometer 122, the coolant temperature gauge 123 and the oil gauge 124, and the needle 125 moving along the scale based on a change of a target value displayed on each gauge is provided thereon. Accordingly, a driver may read the scale on a portion located with the needle 125 to check the target value displayed on each gauge.

Here, the vehicle dashboard 100 according to the first embodiment of the present disclosure may include a display unit 120 for displaying the foregoing engine rotation speed of the vehicle, the speed of the vehicle, the coolant temperature and oil condition information, and the like, and the display unit 120 may implement an image displayed through a liquid crystal panel, for example.

The display unit 120 may have a shape mixed with various shapes such as a straight line, a curved line and the like, and for an example, a portion excluding a hole (not shown) for allowing the needle 125 of the tachometer 121 and speedometer 122 to pass therethrough may be a display area.

Accordingly, the vehicle dashboard 100 may display the text plates 126, 127 of the tachometer 121, the speedometer 122, the coolant temperature gauge 123 and the oil gauge 124, and other information, and mark predetermined numbers according to a scale to exhibit numerical values such as an RPM, a speed, a coolant temperature and an amount of oil.

Referring to FIGS. 3 through 7, an irregular shape display 100 according to a first embodiment of the present disclosure may largely include a liquid crystal panel 110 in which liquid crystals are injected between a color filter substrate 105 and an array substrate 115 to display an image, a backlight unit 140 provided on a rear surface of the liquid crystal panel 110 to emit light over the entire surface of the liquid crystal panel 110, and a lower cover 150 configured to accommodate and fix the liquid crystal panel 110 and backlight unit 140.

The liquid crystal panel 110 may include the color filter substrate 105 in which pixels are arranged in a matrix form to display an image, and bonded thereto to maintain a uniform cell gap to face each other, an array substrate 115, and a liquid crystal layer (not shown) formed in a cell gap between the color filter substrate 105 and array substrate 115.

Though not shown in detail in the drawing, a common electrode and a pixel electrode are formed on the liquid crystal panel 110 bonded to the color filter substrate 105 and array substrate 115 to apply an electric field to the liquid crystal layer, and when a voltage of a data signal applied to the pixel electrode is controlled in a state that a voltage is applied to the common electrode, liquid crystals in the liquid crystal layer rotate by dielectric anisotropy according to the electric field between the common electrode and the pixel electrode to transmit or block light for each pixel, thereby displaying a text or image.

Here, a switching element such as a thin film transistor (TFT) may be individually provided on pixels to control the voltage of the data signal applied to the pixel electrode for each pixel.

In other words, a gate line and a data line, which are vertically and horizontally arranged to define a pixel region, are formed on the array substrate 115, and a thin film transistor which is a switching device is formed at an intersection region between the gate line and data line.

The thin film transistor may include a gate electrode connected to a gate line, a source electrode connected to a data line and a drain electrode connected to a pixel electrode.

The color filter substrate 105 may include a color filter configured with a plurality of sub-color filters for implementing red, green and blue colors, a black matrix for dividing between sub-color filters and blocking light passing through the liquid crystal layer, and an overcoat layer formed on the color filter and the black matrix.

Upper and lower polarizers 101, 111 (shown in FIGS. 5 and 6) are adhered to an outer side of the color filter substrate 105 and array substrate 115, wherein the lower polarizer 111 polarizes light that has passed through the backlight unit 140, and the upper polarizer 101 polarizes light that has passed through the liquid crystal panel 110.

Here, an edge side of the liquid crystal panel 110 bonded to the color filter substrate 105 and array substrate 115 may be sealed with a sealing material 148 (shown in FIG. 6) through side sealing. However, the present disclosure may not be necessarily limited to this. Furthermore, as illustrated in FIG. 6, the upper polarizer 101 may be adhered to cover part of the sealing material 148, but the present disclosure may not be necessarily limited to this.

Describing the backlight unit 140 according to the first embodiment of the present disclosure in detail, a light source unit 130 including a light source 132 for generating light may be provided at one side of a light guide plate 142, and a reflector 141 may be provided on rear surface of the light guide plate 142.

Furthermore, a plurality of optical sheets 143 for enhancing an efficiency of light exited from the light guide plate 142 to irradiate on the liquid crystal panel 110 may be disposed on an upper surface of the light guide plate 142.

However, the present disclosure may not be necessarily limited to the foregoing structure of the backlight unit 140, and the backlight unit 140 having any structure may be also applicable to any irregular shape display 100 according to the present disclosure.

The light guide plate 142 receives light from the light source 132, and guides the light to the side of the liquid crystal panel 110. Here, the light provided from the light source 132 is provided to an incident surface of the light guide plate 142. The incident surface faces one side portion 150a among the side portions 150a of the lower cover 150. In other words, the light source 132 is located on the one side portion 150a of the lower cover 150, and the incident surface of the light guide plate 142 faces the light exit surface of the light source 132.

The light guide plate 142 may be formed a plastic such as polymethyl methacrylate (PMMA) or polycarbonate (PC).

The reflector 141 is located between the lower cover 150 and a rear surface of the light guide plate 142. The reflector 141 performs the role of reflecting light from the light source 132 and the light from the light guide plate 142 to the side of the liquid crystal panel 110. Here, FIG. 6 illustrate a case where the reflector 141 is formed in a shape of surrounding an edge side of the light guide plate 142 as an example, but the present disclosure may not be necessarily limited to this.

Furthermore, the light source 132 may be selected from any one of a cold cathode fluorescence lamp (CCFL), a hot cathode fluorescence lamp (HCFL), an external electrode fluorescence lamp (EEFL) and a light emitting diode (LED), but may not be necessarily limited to this. Hereinafter, for the sake of convenience of explanation, a case where an LED array is used for the light source 132 will be taken as an example.

The LED array may include a light-emitting package provided with at least one LED. The light-emitting package may be a light-emitting package having different colors, for example, a red light emitting diode, a green light emitting diode and a blue light emitting diode.

For example, the LED array may be provided on a flexible printed circuit board (FPCB) 131 such that a light exit surface thereof faces an incident surface of the light guide plate 142. In other words, the light source unit 130 may include the flexible printed circuit board 131 and a plurality of light sources 132 such as an LED array mounted on one surface of the flexible printed circuit board 131. The flexible printed circuit board 131 as a circuit board in which a complex circuit is formed on a flexible insulating film is a board using a heat-resistant plastic film such as polyester or polyimide which is a flexible material.

The light source 132 may be connected to an inverter to receive power to emit light.

Light emitted from the light source 132 is incident to a lateral surface of the light guide plate 142 having a transparent material, and the reflector 141 disposed on a rear surface of the light guide plate 142 reflects light transmitted through the rear surface of the light guide plate 142 to the side of the optical sheets 143 on an upper surface of the light guide plate 142, thereby reducing the loss of light and enhancing the uniformity.

Here, the optical sheets 143 may include a diffusion sheet 143a and a prism sheet 143b, and a luminance enhancement film 143c such as a dual brightness enhancement film (DBEF) and a protective sheet may be added thereto.

The optical sheets 143 may be provided between an upper surface of the light guide plate 142 and a rear surface of the liquid crystal panel 110. The prism sheet 143b condenses light from the light guide plate 142, and the diffusion sheet 143a diffuses light from the prism sheet 143b, and the protective sheet performs the role of protecting the luminance enhancement film 143c, the prism sheet 143b and the optical sheets 143. Light that has passed through the protective sheet is provided to the side of the liquid crystal panel 110.

The backlight unit 140 having the foregoing structure is accommodated into the lower cover 150.

The lower cover 150 may include a plurality of side portions 150a extended in perpendicular to the bottom. The side portions 150a may be extended in perpendicular thereto to a predetermined height from each edge of the lower cover 150. The edges of the side portions 150a adjacent to each other may be connected to each other.

Each of the side portions 150a may include mounting portions 150a' bent toward the center of the irregular shape display 100 to have a predetermined width, and the liquid crystal panel 110 may be mounted on the mounting portions 150a'.

A space surrounded by the side portions 150a and the mounting portions 150a' constitutes an accommodation space in which the backlight unit 140 is accommodated. In other words, it is seen that the side portions 150a and mounting portions 150a' are bent in a "⊏"-shape from the bottom of the lower cover 150. Accordingly, the reflector 141, the light guide plate 142 and the optical sheets 143 are accommodated into the lower cover 150, and the light guide plate 142 and the optical sheets 143 may be fixed to an inner portion of the lower cover 150 by the side portions 150a and the mounting portions 150a' of the lower cover 150 bent in a "⊏"-shape.

Here, an accommodation groove in which a plurality of light sources 132 and the flexible printed circuit board 131 are accommodated may be formed at one side of the inner portion of the lower cover 150 corresponding to the light source unit 130.

Furthermore, a predetermined shielding tape 146 (shown in FIG. 6) may be provided at an upper portion of the backlight unit 140 having the foregoing structure.

The shielding tape 146 may correspond to a region corresponding to the light source unit 130 and an edge of the lower cover 150, and perform the role of fixing the liquid crystal panel 110 to the lower cover 150 and/or guide member 145. An adhesive may be applied on both surfaces of the shielding tape 146 to perform the role of fixing the liquid crystal panel 110 to the backlight unit 140, namely, the lower cover 150, and the entire thereof may be of black to perform the role of preventing light emitted from the backlight unit 140 from being leaked out to the outside.

In the irregular shape display 100 according to the first embodiment of the present disclosure having the foregoing configuration, the liquid crystal panel 110 may have the irregular shape display 100, for example, a shape corresponding to an outer shape of the vehicle dashboard, based on a display surface thereof. In addition, the mechanism and optical components of the backlight unit 140, namely, the optical sheets 143, the light guide plate 142, the reflector 141 and the lower cover 150, may have a shape corresponding to an outer shape of the irregular shape display 100 as a whole. However, the present disclosure may not be necessarily limited to this, and may have a curved shape such as a circular or elliptical shape or a polygonal shape such as a rectangular or diamond shape or may have a mixed shape with various shapes.

Furthermore, a first hole 110', second holes 143a', 143b', 143c', a third hole 142', a fourth hole 141' and a fifth hole 150' with a circular shape may be formed in predetermined regions of the left and right sides of the liquid crystal panel 110, the optical sheets 143, the light guide plate 142, the reflector 141 and the lower cover 150. However, the present disclosure may not be necessarily limited to this. For example, the first hole 110', the second holes 143a', 143b', 143c', the third hole 142', the fourth hole 141' and the fifth hole 150' may also have a curved shape such as a circular or elliptical shape or a polygonal shape such as a rectangular or diamond shape or may have a mixed shape with various shapes.

When the irregular shape display 100 is applied to the vehicle dashboard, the first hole 110', the second holes 143a', 143b', 143c', the third hole 142', the fourth hole 141' and the fifth hole 150' may be holes through which the needles of the tachometer and the speedo meter penetrate.

The liquid crystal panel 110 may display an image in a region excluding the first hole 110' during actual display.

For an example, the first hole 110' may have a diameter larger than that of the second holes 143a', 143b', 143c', the third hole 142' and the fourth hole 141', and the second holes 143a', 143b', 143c', the third hole 142' and the fourth hole 141' may have a diameter larger than that of the fifth hole 150'.

As described above, the fifth hole 150' with a circular shape may be formed in predetermined regions of the left and right sides of the lower cover 150. Here, the guide member 145 inserted through the second holes 143*a*', 143*b*', 143*c*', the third hole 142' and the fourth hole 141' may be located at an edge of the lower cover 150 around the fifth hole 150'.

A lateral surface corresponding to the second holes 143*a*', 143*b*', 143*c*', the third hole 142' and the fourth hole 141' of the optical sheets 143*a*, 143*b*, 143*c*, the light guide plate 142 and the reflector 141 may be brought into contact with a lateral surface of the guide member 145, or located in the vicinity thereof. In other words, the guide member 145 may pass through the second holes 143*a*', 143*b*', 143*c*', the third hole 142' and the fourth hole 141' of the optical sheets 143*a*, 143*b*, 143*c*, the light guide plate 142 and the reflector 141 to accommodate the optical sheets 143*a*, 143*b*, 143*c*, the light guide plate 142 and the reflector 141 into the lower cover 150.

Here, the guide member 145 according to the first embodiment of the present disclosure may have a cylindrical shape similar to the hole, and particularly, may be partially inserted and provided only into the left and right holes while performing the role of the existing guide panel.

In other words, the present disclosure may be provided with a guide member 145 partially inserted and provided only into a hole other than a guide panel in a rectangular frame shape that surrounds an edge of the display as in the related art.

The guide member 145 according to the first embodiment of the present disclosure performs the role of guiding when the optical sheets 143*a*, 143*b*, 143*c*, the light guide plate 142 and the reflector 141 are accommodated into the lower cover 150, and in other words, the optical sheets 143*a*, 143*b*, 143*c*, the light guide plate 142 and the reflector 141 are inserted into the guide member 145 through the second holes 143*a*', 143*b*', 143*c*', the third hole 142' and the fourth hole 141'. Furthermore, in this state, the guide member 145 is placed on an upper edge of the lower cover 150 around the fifth hole 150'. Accordingly, the guide member 145 includes a sixth hole (H) corresponding to the fifth hole 150' therein. Here, a diameter of the sixth hole (H) may be substantially the same as that of the fifth hole 150'. However, the present disclosure may not be necessarily limited to this, and a diameter of the sixth hole (H) may be different from that of the fifth hole 150'.

As described above, according to the present disclosure, a cylindrical shape guide member 145 may be applicable to the hole region to insert and fix the optical sheets 143, the light guide plate 142 and the reflector 141 thereto so as to delete the existing rectangular frame shape, so that a narrow bezel can be implemented.

The guide member 145 may be formed of the same or similar material, for example, PMMA or PC, to that of the light guide plate 142, and the guide member 145 may be inserted into the hole to reduce a luminance difference between the front and the back (F, R) of the hole. However, the present disclosure may not be necessarily limited to this, and any material may be also applicable such as a transparent material as long as it allows light to pass therethrough and reach up to a rear portion (R) of the hole.

In other words, when a hole is provided on the liquid crystal panel and the backlight unit, namely, within the light guide plate, in an edge type backlight unit in which a light source is located on a lateral surface of the light guide plate, a luminance difference between the front and the back of the hole occurs based on the light source. Such a luminance difference may be minimized by adjusting a pattern density, a pattern size, an injection condition or the like at a lower portion of the light guide plate.

However, it may cause difficulty in obtaining a uniform luminance on an image in the vicinity of the hole only with the foregoing adjustment, and a luminance difference between the front and the back of the hole may gradually increase as the hole size is increased, and thus a more fundamental solution should be provided.

Luminance at a front portion of the hole is dependent on a pattern density, a pattern size, an injection condition or the like of the light guide plate, like the existing backlight unit. However, light should be transmitted to a rear portion of the hole by making a detour since light is unable to directly reach to the rear portion of the hole. Accordingly, in the related art, a luminance difference inevitably occurs between the front and the back of the hole.

Accordingly, in the present disclosure, a cylindrical shape guide member 145 having a size smaller than that of the hole, and with the same material as that of the light guide plate 142 may be inserted into the hole (i.e., the second holes 143*a*', 143*b*', 143*c*', the third hole 142' and the fourth hole 141') to transmit light up to the rear portion (R) of the hole, thereby reducing a luminance difference between the front and the back (F, R) of the hole. In other words, the guide member 145 of the present disclosure performs the role of directly transmitting light up to the rear portion (R) of the hole without blocking a light path to improve a dark portion of the rear portion (R) of the hole and enhance the light uniformity of the backlight unit, thereby providing an effect of improving image quality.

Furthermore, as shown in FIG. 5, a reflection sheet 149 may be located on the cylindrical shape guide member 145 to block the light leaked out through an air layer between the light guide plate 142 and the guide member 145.

The reflection sheet 149 may be formed of a reflective metal material, and placed on the optical sheets 143 by interposing a pad 147 therebetween. In other words, the pad 147 may be interposed between the reflection sheet 149 placed on the guide member 145 and the reflection sheet 149 at another side thereof and the optical sheets 143 to compensate a height difference to the guide member 145.

A multi-layered film coated with silver, aluminium or the like in addition to a metal material or a multi-layered film on which refractive index anisotropic materials are alternately deposited may be applicable to the reflection sheet 149.

The reflection sheet 149 may have a flat cylindrical shape, namely, a disk shape, and an external diameter thereof may be relatively larger than that of the guide member 145. In other words, the reflection sheet 149 may overlap one side of the optical sheets 143 around the second holes 143*a*', 143*b*', 143*c*', and the pad 147 may be located at the overlapping portion as shown in FIG. 5.

Furthermore, an internal diameter of the reflection sheet 149 may be the same or substantially the same as an internal diameter of the guide member 145, namely, a diameter of the sixth hole (H).

The pad 147 may have a constant elasticity, and have a disk shape similar to the reflection sheet 149. An adhesive may be coated on or beneath or both on and beneath the pad 147.

Figures 8, 9:
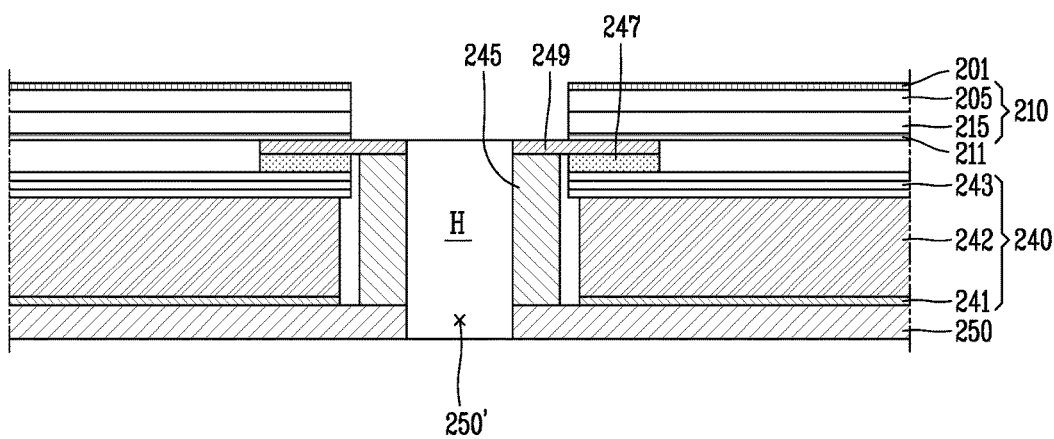
FIG. 8 is a table illustrating a luminance difference between the front and the back of a hole in the irregular shape display according to the first embodiment of the present disclosure as an example.
FIG. 9 is a view schematically illustrating a partial cross-section of an irregular shape display according to a second embodiment of the present disclosure.

FIG. 8 is a table illustrating a luminance difference between the front and the back of a hole as an example.

Here, FIG. 8 illustrates a luminance difference between the front and the back of the hole according to the existence or non-existence of the guide member through a simulation. Furthermore, a difference disclosed in FIG. 8 is a value obtained by subtracting a luminance difference of the comparison example from a luminance difference of the embodiment, and it is determined that a luminance difference between the front and the back of the hole significantly decreases as a minus difference value increases.

For the simulation method, for example, a hole with a radius of 1 to 8 mm is made on a different shaped light guide plate with a thickness of 3.0 mm, and 48 LEDs in a size of 3.0 mm×1.4 mm are disposed to be separated from the light guide plate by 0.2 mm.

Here, a luminance change is measured at the front and the back of the hole with increasing the radius of the hole from 1 mm to 8 mm by 1 mm in each step.

Here, the guide member used in the embodiment is formed with a radius smaller than that of the hole, and a luminance difference between the front and the back of the hole is measured by increasing 1 mm in each step.

Referring to FIG. 8, as a result of the simulation, it is seen that a luminance difference between the front and the back of the hole increases as a radius of the hole increases.

However, it is also seen that a luminance difference of the embodiment to which the guide member is applied is smaller than that of the comparison example to which the guide member is not applied. Such a trend is significant as increasing the radius of the hole, and it is seen that a dark portion around the hole has been improved when the guide member of the present disclosure is applied thereto.

On the other hand, in case of the first embodiment of the present disclosure, a case where a diameter of the first hole is the same as or larger than an external diameter of the reflection sheet, and thus the liquid crystal panel does not overlap the reflection sheet is taken as an example, but the present disclosure may not be necessarily limited to this. The present disclosure may be also applicable to a case where the liquid crystal panel is mounted on the reflection sheet since a diameter of the first hole is smaller than an external diameter of the reflection sheet, and it will be described in detail through a second embodiment of the present disclosure.

FIG. 9 is a view schematically illustrating a partial cross-section of an irregular shape display according to a second embodiment of the present disclosure.

Figure 10:
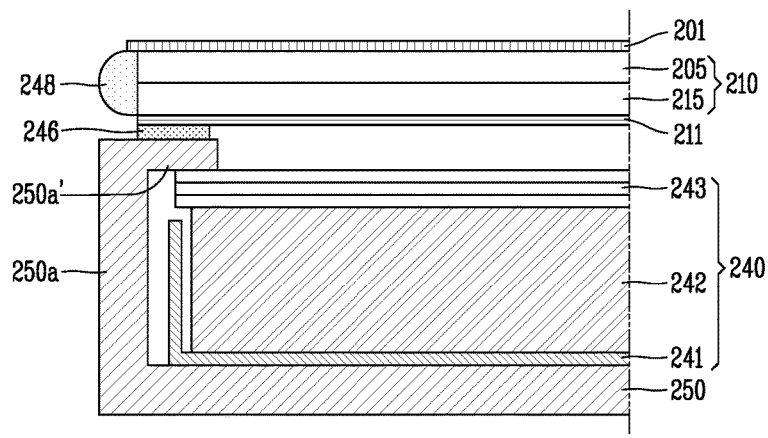
FIG. 10 is a view schematically illustrating another partial cross-section of the irregular shape display according to the second embodiment of the present disclosure.

Furthermore, FIG. 10 is a view schematically illustrating another partial cross-section of the irregular shape display according to the second embodiment of the present disclosure.

Here, FIG. 9 illustrates a cross-section around the hole as an example, and FIG. 10 illustrates a cross-section of an edge portion of the hole as an example.

Furthermore, the irregular shape display according to the second embodiment of the present disclosure illustrated in FIGS. 9 and 10 may have substantially the same configuration as that of the foregoing first embodiment of the present disclosure except for the liquid crystal panel being mounted on the reflection sheet.

Referring to FIGS. 9 and 10, the irregular shape display according to the second embodiment of the present disclosure may include a liquid crystal panel 210 in which liquid crystals are injected between a color filter substrate 205 and an array substrate 215 to display an image, a backlight unit 240 provided on a rear surface of the liquid crystal panel 210 to emit light over the entire surface of the liquid crystal panel 210, and a lower cover 250 configured to accommodate and fix the liquid crystal panel 210 and the backlight unit 240.

As described above, the liquid crystal panel 210 may include the color filter substrate 205 in which pixels are arranged in a matrix form to display an image, and bonded thereto to maintain a uniform cell gap to face each other, the array substrate 215, and the liquid crystal layer formed in the cell gap between the color filter substrate 205 and the array substrate 215.

Upper and lower polarizers 201, 211 are adhered to an outer side of the color filter substrate 205 and the array substrate 215, wherein the lower polarizer 211 polarizes light that has passed through the backlight unit 240, and the upper polarizer 201 polarizes light that has passed through the liquid crystal panel 210.

Here, an edge side of the liquid crystal panel 210 bonded to the color filter substrate 205 and the array substrate 215 may be sealed with a sealing material 248 through side sealing. However, the present disclosure may not be necessarily limited to this. Furthermore, as illustrated in FIG. 10, the upper polarizer 201 may be adhered to cover a part of the sealing material 248, but the present disclosure may not be necessarily limited to this.

Describing the backlight unit 240 according to the second embodiment of the present disclosure in detail, a light source unit (not shown) including a light source for generating light may be provided at one side of a light guide plate 242, and a reflector 241 may be provided on rear surface of the light guide plate 242.

Furthermore, a plurality of optical sheets 243 for enhancing an efficiency of light exited from the light guide plate 242 to irradiate on the liquid crystal panel 210 may be disposed on an upper surface of the light guide plate 242.

However, the present disclosure may not be necessarily limited to the foregoing structure of the backlight unit 240, and the backlight unit 240 having any structure may be also applicable to any irregular shape display according to the present disclosure.

The light guide plate 242 receives light from the light source 232, and guides the light to the side of the liquid crystal panel 210.

The light guide plate 242 may be formed a plastic such as PMMA or PC.

Figure 11:
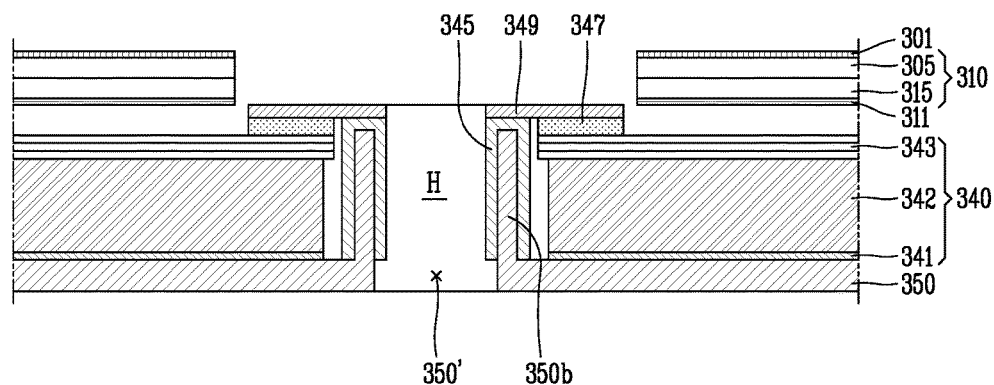
FIG. 11 is a view schematically illustrating a partial cross-section of an irregular shape display according to a third embodiment of the present disclosure.
Figure 12:
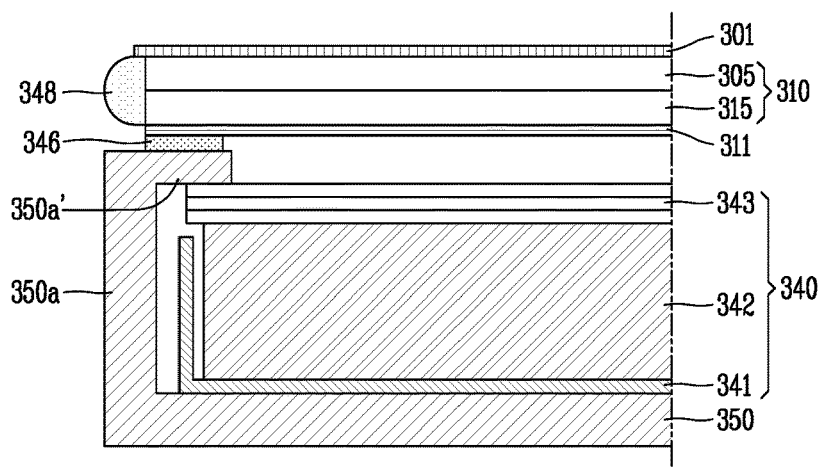
FIG. 12 is a view schematically illustrating another partial cross-section of the irregular shape display according to the third embodiment of the present disclosure.

The reflector 241 is located between the lower cover 250 and a rear surface of the light guide plate 242. The reflector 241 performs the role of reflecting light from the light source and light from the light guide plate 242 to the side of the liquid crystal panel 210. Here, FIGS. 11 and 12 illustrate a case where a reflector 341 is formed in a shape of surrounding an edge side of a light guide plate 342 as an example, which will be explained more fully as a third embodiment.

Furthermore, the light source may be selected from any one of CCFL, HCFL, EEFL and LED, but may not be necessarily limited to this. Hereinafter, for the sake of convenience of explanation, a case where an LED array is used for the light source will be taken as an example.

The LED array is provided on a flexible printed circuit board such that a light exit surface thereof faces an incident surface of the light guide plate 242. In other words, the light source unit may include the flexible printed circuit board and a plurality of light sources such as an LED array mounted on one surface of the flexible printed circuit board.

The light source may be connected to an inverter to receive power to emit light.

Light emitted from the light source is incident to a lateral surface of the light guide plate 242 having a transparent material, and the reflector 241 disposed on a rear surface of the light guide plate 242 reflects light transmitted through the rear surface of the light guide plate 242 to the side of the optical sheets 243 on an upper surface of the light guide plate 242, thereby reducing the loss of light and enhancing the uniformity.

Here, though not shown in the drawing in detail, the optical sheets 243 may include a diffusion sheet and a prism sheet, and a luminance enhancement film such as DBEF and a protective sheet may be added thereto.

The optical sheets 243 may be provided between an upper surface of the light guide plate 242 and a rear surface of the liquid crystal panel 210.

The backlight unit 240 having the foregoing structure is accommodated into the lower cover 250.

The lower cover 250 may include a plurality of side portions 250a extended in perpendicular to the bottom. The side portions 250a may be extended in perpendicular thereto to a predetermined height from each edge of the lower cover 250. The edges of the side portions 250a adjacent to each other may be connected to each other.

Each of the side portions 250a may include mounting portions 250a' bent toward the center of the irregular shape display to have a predetermined width, and the liquid crystal panel 210 may be mounted on the mounting portions 250a'.

A space surrounded by the side portions 250a and the mounting portions 250a' constitutes an accommodation space in which the backlight unit 240 is accommodated. In other words, it is seen that the side portions 250a and the mounting portions 250a' are bent in a " ⌐ "-shape from the bottom of the lower cover 250. Accordingly, the reflector 241, the light guide plate 242 and the optical sheets 243 are accommodated into the lower cover 250, and the light guide plate 242 and the optical sheets 243 may be fixed to an inner portion of the lower cover 250 by the side portions 250a and the mounting portions 250a' of the lower cover 250 bent in a " ⌐ "-shape.

Here, an accommodation groove in which a plurality of light sources and the flexible printed circuit board are accommodated may be formed at one side of the inner portion of the lower cover 250 corresponding to the light source unit.

Furthermore, a predetermined shielding tape 246 may be provided at an upper portion of the backlight unit 240 having the foregoing structure.

The shielding tape 246 may correspond to a region corresponding to the light source unit and an edge of the lower cover 250, and perform the role of fixing the liquid crystal panel 210 to the lower cover 250. An adhesive may be coated on both surfaces of the shielding tape 246 to perform the role of fixing the liquid crystal panel 210 to the backlight unit 240, namely, lower cover 250, and the entire thereof may be of black to perform the role of preventing light emitted from the backlight unit 240 from being leaked out to the outside.

In the irregular shape display according to the second embodiment of the present disclosure having the foregoing configuration, the liquid crystal panel 210 may have an irregular shape display, for example, a shape corresponding to an outer shape of the vehicle dashboard, based on a display surface thereof. In addition, the mechanism and optical components of the backlight unit, namely, the optical sheets 243, the light guide plate 242, the reflector 241 and the lower cover 250, may have a shape corresponding to an outer shape of the irregular shape display as a whole. However, the present disclosure may not be necessarily limited to this, and may have a curved shape such as a circular or elliptical shape or a polygonal shape such as a rectangular or diamond shape or may have a mixed shape with various shapes.

Furthermore, as described above, a first hole, second holes, a third hole, a fourth hole and a fifth hole 250' with a circular shape may be formed in predetermined regions of the left and right sides of the liquid crystal panel 210, the optical sheets 243, the light guide plate 242, the reflector 231 and lower cover 250. However, the present disclosure may not be necessarily limited to this, the first hole, the second holes, the third hole, the fourth hole and the fifth hole 250' may also have a curved shape such as a circular or elliptical shape or a polygonal shape such as a rectangular or diamond shape or may have a mixed shape with various shapes.

When the irregular shape display is applied to the vehicle dashboard, the first hole, the second holes, the third hole, the fourth hole and the fifth hole 250' may be holes through which the needles of the tachometer and the speedo meter penetrate.

The liquid crystal panel 210 may display an image in a region except for the first hole during actual display.

For an example, the first hole may have a diameter larger than that of the second holes, the third hole and the fourth hole, and the second holes, the third hole and the fourth hole may have a diameter larger than that of the fifth hole 250'.

As described above, the fifth hole 250' with a circular shape may be formed in predetermined regions of the left and right sides of the lower cover 250. Here, a guide member 250 inserted through the second holes, the third hole and the fourth hole is located at an edge of the guide member 250 around the fifth hole 250'.

A lateral surface corresponding to the second holes, the third hole and the fourth hole of the optical sheets 243, the light guide plate 242 and the reflector 241 may be brought into contact with a lateral surface of the guide member 245, or located in the vicinity thereof. In other words, the guide member 245 inserted through the second holes, the third hole and the fourth hole of the optical sheets 243, the light guide plate 242 and the reflector 241 to accommodate the optical sheets 243, the light guide plate 242 and the reflector 241 into the lower cover 250.

Here, similar to the foregoing first embodiment of the present disclosure, the guide member 245 according to the second embodiment of the present disclosure may have a cylindrical shape similar to the hole, and particularly, may be partially inserted and provided only into the left and right holes while performing the role of the existing guide panel.

In other words, the present disclosure may be provided with a guide member 245 partially inserted and provided only into a hole other than a guide panel in a rectangular frame shape that surrounds an edge of the display as in the related art.

The guide member 245 according to the second embodiment of the present disclosure performs the role of guiding when the optical sheets 243, the light guide plate 242 and the reflector 241 are accommodated into the lower cover 250, and in other words, the optical sheets 243, the light guide plate 242 and the reflector 241 are inserted into the guide member 245 through the second holes, the third hole and the fourth hole. Furthermore, in this state, the guide member 245 is placed on an upper edge of the lower cover 250 around the fifth hole 250'. Accordingly, the guide member 245 includes a sixth hole (H) corresponding to the fifth hole 250' therein. Here, a diameter of the sixth hole (H) may be substantially the same as that of the fifth hole 250'. However, the present disclosure may not be necessarily limited to this, and a diameter of the sixth hole (H) may be different from that of the fifth hole 250'.

As described above, according to the present disclosure, a cylindrical shape guide member 245 may be applicable to the hole region to insert and fix the optical sheets 243, the light guide plate 242 and the reflector 241 thereto so as to eliminate the existing rectangular frame shape, a narrow bezel can be implemented.

The guide member 245 may be formed of the same or similar material, for example, PMMA or PC, to that of the light guide plate 242, and the guide member 245 may be inserted into the hole to reduce a luminance difference between the front and the back of the hole. However, the present disclosure may not be necessarily limited to this, and any material may be also applicable such as a transparent material as long as it allows light to pass therethrough and reach up to a rear portion of the hole.

In other words, in the present disclosure, a cylindrical shape guide member 245 having a size smaller than that of the hole, and with the same material as that of the light guide plate 242 may be inserted into the hole (i.e., second holes, third hole and fourth hole) to transmit light up to the rear portion of the hole, thereby reducing a luminance difference between the front and the back of the hole. In other words, the guide member 245 of the present disclosure performs the role of directly transmitting light up to the rear portion of the hole without blocking a light path to improve a dark portion of the rear portion of the hole and enhance the light uniformity of the backlight unit, thereby improving image quality of the display.

Furthermore, a reflection sheet 249 may be located on the cylindrical shape guide member 245 to block the light leaked out through an air layer between the light guide plate 242 and the guide member 245.

The reflection sheet 249 may be formed of a reflective metal material, and placed on the optical sheets 243 by interposing a pad 247 therebetween. In other words, the pad 247 may be interposed between a reflection sheet 249 placed on the guide member 245 and the reflection sheet 249 at another side thereof and the optical sheets 243 to compensate a height difference to the guide member 245.

A multi-layered film coated with silver, aluminium or the like in addition to a metal material or a multi-layered film on which refractive index anisotropic materials are alternately deposited may be applicable to the reflection sheet 249.

The reflection sheet 249 may have a flat cylindrical shape, namely, a disk shape, and an external diameter thereof may be relatively larger than that of the guide member 245. In other words, the reflection sheet 249 may overlap one side of the optical sheets 243 around the second holes, and the pad 247 may be located at the overlapping portion.

Furthermore, an internal diameter of the reflection sheet 249 may be the same or substantially the same as an internal diameter of the guide member 245, namely, a diameter of the sixth hole (H).

The pad 247 may have a constant elasticity, and have a disk shape similar to the reflection sheet 249. An adhesive may be coated on or beneath or both on and beneath the pad 247.

Here, in the second embodiment of the present disclosure, a diameter of the first hole may be smaller than an external diameter of the reflection sheet 249 such that the liquid crystal panel 210 is mounted on the reflection sheet 249. In this case, the liquid crystal panel 210 may be supported in the vicinity of the hole thereof as well as at an edge thereof, so that the liquid crystal panel 210 can be more stably fastened than the foregoing first embodiment of the present disclosure.

Furthermore, according to the present disclosure, a protruding portion protruded along an edge of the fifth hole may be provided on the lower cover to secure fastenability between the guide member and the lower cover, and it will be described in detail through the following third embodiment of the present disclosure.

FIG. 11 is a view schematically illustrating a partial cross-section of an irregular shape display according to a third embodiment of the present disclosure.

FIG. 12 is a view schematically illustrating another partial cross-section of the irregular shape display according to the third embodiment of the present disclosure.

Figure 13:
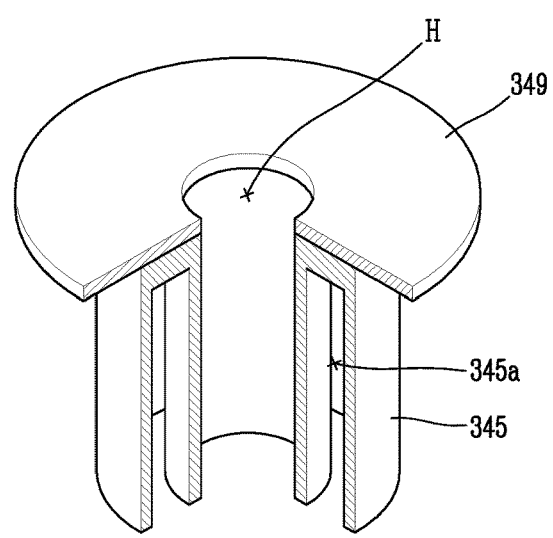
FIG. 13 is a perspective view schematically illustrating the structure of a guide member in the irregular shape display according to the third embodiment of the present disclosure.

FIG. 13 is a perspective view schematically illustrating the structure of a guide member in the irregular shape display according to the third embodiment of the present disclosure.

Here, FIG. 11 illustrates a cross-section around the hole as an example, and FIG. 12 illustrates a cross-section at an edge portion of the hole as an example.

Furthermore, the irregular shape display according to the third embodiment of the present disclosure illustrated in FIGS. 11 through 13 may have substantially the same configuration as that of the foregoing first embodiment of the present disclosure except for the guide member being fastened to a protruding portion of the lower cover.

Referring to FIGS. 11 through 13, the irregular shape display according to the third embodiment of the present disclosure may include a liquid crystal panel 310 in which liquid crystals are injected between a color filter substrate 305 and an array substrate 315 to display an image, a backlight unit 340 provided on a rear surface of the liquid crystal panel 310 to emit light over the entire surface of the liquid crystal panel 310, and a lower cover 350 configured to accommodate and fix the liquid crystal panel 310 and the backlight unit 340.

As described above, the liquid crystal panel 310 may include the color filter substrate 305 in which pixels are arranged in a matrix form to display an image, and bonded thereto to maintain a uniform cell gap to face each other, the array substrate 315, and the liquid crystal layer formed in the cell gap between the color filter substrate 305 and the array substrate 315.

Upper and lower polarizers 301, 311 are adhered to an outer side of the color filter substrate 305 and the array substrate 315, wherein the lower polarizer 311 polarizes light that has passed through the backlight unit 340, and the upper polarizer 301 polarizes light that has passed through the liquid crystal panel 310.

Here, an edge side of the liquid crystal panel 310 bonded to the color filter substrate 305 and the array substrate 315 may be sealed with a sealing material 348 through side sealing. However, the present disclosure may not be necessarily limited to this. Furthermore, as illustrated in FIG. 12, the upper polarizer 301 may be adhered to cover a part of the sealing material 348, but the present disclosure may not be necessarily limited to this.

Describing the backlight unit 340 according to the third embodiment of the present disclosure in detail, a light source unit (not shown) including a light source for generating light may be provided at one side of a light guide plate 342, and a reflector 341 may be provided on rear surface of the light guide plate 342.

Furthermore, a plurality of optical sheets 343 for enhancing an efficiency of light exited from the light guide plate 342 to irradiate it on the liquid crystal panel 310 may be disposed on an upper surface of the light guide plate 342.

However, the present disclosure may not be necessarily limited to the foregoing structure of the backlight unit 340, and the backlight unit 340 having any structure may be also applicable to any irregular shape display according to the present disclosure.

The light guide plate 342 receives light from the light source 332, and guides the light to the side of the liquid crystal panel 310.

The light guide plate 342 may be formed a plastic such as PMMA or PC.

The reflector 341 is located between the lower cover 350 and a rear surface of the light guide plate 342. The reflector 341 performs the role of reflecting light from the light source and light from the light guide plate 342 to the side of the liquid crystal panel 310. Here, FIG. 12 illustrate a case where the reflector 341 is formed in a shape of surrounding an edge side of the light guide plate 342 as an example, but the present disclosure may not be necessarily limited to this.

Furthermore, the light source may be selected from any one of CCFL, HCFL, EEFL and LED, but may not be necessarily limited to this. Hereinafter, for the sake of convenience of explanation, a case where an LED array is used for the light source will be taken as an example.

The LED array is provided on a flexible printed circuit board such that a light exit surface thereof faces an incident surface of the light guide plate 342. In other words, the light source unit may include the flexible printed circuit board and a plurality of light sources such as an LED array mounted on one surface of the flexible printed circuit board.

The light source may be connected to an inverter to receive power to emit light.

Light emitted from the light source is incident to a lateral surface of the light guide plate 342 having a transparent material, and the reflector 341 disposed on a rear surface of the light guide plate 342 reflects light transmitted through the rear surface of the light guide plate 342 to the side of the optical sheets 343 on an upper surface of the light guide plate 342, thereby reducing the loss of light and enhancing the uniformity.

Here, though not shown in the drawing in detail, the optical sheets 343 may include a diffusion sheet and a prism sheet, and a luminance enhancement film such as DBEF and a protective sheet may also be added thereto.

The optical sheets 343 may be provided between an upper surface of the light guide plate 342 and a rear surface of the liquid crystal panel 310.

The backlight unit 340 having the foregoing structure is accommodated into the lower cover 350.

The lower cover 350 may include a plurality of side portions 350a perpendicularly extended from the bottom. The side portions 350a may also be perpendicularly extended to a predetermined height from each edge of the lower cover 350. The edges of the side portions 350a adjacent to each other may be connected to each other.

Each of the side portions 350a may include mounting portions 350a' bent toward the center of the irregular shape display to have a predetermined width, and the liquid crystal panel 310 may be mounted on the mounting portions 350a'.

A space surrounded by the side portions 350a and the mounting portions 350a' constitutes an accommodation space in which the backlight unit 340 is accommodated. In other words, it is seen that the side portions 350a and the mounting portions 350a' are bent in a " ⌐ "-shape from the bottom of the lower cover 350. Accordingly, the reflector 341, the light guide plate 342 and the optical sheets 343 are accommodated into the lower cover 350, and the light guide plate 342 and the optical sheets 343 may be fixed to an inner portion of the lower cover 350 by the side portions 350a and the mounting portions 350a' of the lower cover 350 bent in a " ⌐ "-shape.

Here, an accommodation groove in which a plurality of light sources and the flexible printed circuit board are accommodated may be formed at one side of the inner portion of the lower cover 350 corresponding to the light source unit.

Furthermore, a predetermined shielding tape may be provided at an upper portion of the backlight unit 340 having the foregoing structure.

The shielding tape 346 may correspond to a region corresponding to the light source unit and an edge of the lower cover 350, and perform the role of fixing the liquid crystal panel 310 to the lower cover 350. An adhesive may be applied on both surfaces of the shielding tape 346 to perform the role of fixing the liquid crystal panel 310 to the backlight unit 340, namely, the lower cover 350, and the entire thereof may be of black to perform the role of preventing light emitted from the backlight unit 340 from being leaked out to the outside.

In the irregular shape display according to the third embodiment of the present disclosure having the foregoing configuration, the liquid crystal panel 310 may have an irregular shape display, for example, a shape corresponding to an outer shape of the vehicle dashboard, based on a display surface thereof. In addition, the mechanism and optical components of the backlight unit, namely, the optical sheets 343, the light guide plate 342, the reflector 341 and the lower cover 350, may have a shape corresponding to an outer shape of the irregular shape display as a whole. However, the present disclosure may not be necessarily limited to this, and may have a curved shape such as a circular or elliptical shape or a polygonal shape such as a rectangular or diamond shape or may have a mixed shape with various shapes.

Furthermore, as described above, a first hole, second holes, a third hole, a fourth hole and a fifth hole 350' with a circular shape may be formed in predetermined regions of the left and right sides of the liquid crystal panel 310, the optical sheets 343, the light guide plate 342, the reflector 331 and the lower cover 350. However, the present disclosure may not be necessarily limited to this. For example, the first hole, the second holes, the third hole, the fourth hole and the fifth hole 350' may also have a curved shape such as a circular or elliptical shape or a polygonal shape such as a rectangular or diamond shape or may have a mixed shape with various shapes.

When the irregular shape display is applied to the vehicle dashboard, the first hole, the second holes, the third hole, the fourth hole and the fifth hole 350' may be holes through which the needles of the tachometer and the speedo meter penetrate.

The liquid crystal panel 310 may display an image in a region except for the first hole during actual display.

For an example, the first hole may have a diameter larger than that of the second holes, the third hole and the fourth hole, and the second holes, the third hole and the fourth hole may have a diameter larger than that of the fifth hole 350'.

As described above, the fifth hole 350' with a circular shape may be formed in predetermined regions of the left and right sides of the lower cover 350, and a protruding portion 350b protruded along an edge of the fifth hole 350' may be formed thereon.

The protruding portion 350b may be formed with a structure protruded from an edge of the fifth hole 350' in the direction of the liquid crystal panel 310, and though not shown in the drawing, a predetermined male thread may be formed at an outer side of the protruding portion 350b according to a third embodiment of the present disclosure. However, the present disclosure may not be necessarily limited to this, and a female thread may be formed at an inner side of the protruding portion 350b. The male thread may be formed in a predetermined depth from an upper end of the protruding portion 350b.

A height of the protruding portion 350b may be the same as or larger than the sum of the heights of the reflector 341, the light guide plate 342 and the optical sheets 343 based on an inner surface of the lower cover 350.

Here, in the third embodiment of the present disclosure, a guide member 345 inserted through the second holes, the third hole and the fourth hole may be fastened to the protruding portion 350b.

Accordingly, the guide panel 345 according to the third embodiment of the present disclosure may be fastened the protruding portion 350b of the lower cover 350, for example, in a state of being inserted into the protruding portion 350b. Accordingly, a female thread corresponding to a male thread of the protruding portion 350b may be formed at an inner side of the guide panel 345 being inserted into the protruding portion 350b.

A lateral surface corresponding to the second holes, the third hole and the fourth hole of the optical sheets 343, the light guide plate 342 and the reflector 341 may be brought into contact with a lateral surface of the guide member 345, or located in the vicinity thereof. In other words, the guide member 345 is inserted through the second holes, the third hole and the fourth hole of the optical sheets 343, the light guide plate 342 and the reflector 341 while at the same time being fastened thereto in a state of being inserted into the protruding portion 350b of the lower cover 350 to accommodate the optical sheets 343, light guide plate 342 and reflector 341 into the lower cover 350.

Here, similar to the foregoing first and second embodiments of the present disclosure, the guide member 345 according to the third embodiment of the present disclosure may have a cylindrical shape similar to the hole, and particularly, may be partially inserted and provided only into the left and right holes while performing the role of the existing guide panel.

In other words, the present disclosure may be provided with a guide member 345 partially inserted and provided only into a hole other than a guide panel in a rectangular frame shape that surrounds an edge of the display as in the related art.

The guide member 345 according to the third embodiment of the present disclosure performs the role of guiding when the optical sheets 343, the light guide plate 342 and the reflector 341 are accommodated into the lower cover 350. In other words, the optical sheets 343, the light guide plate 342 and the reflector 341 are inserted into the guide member 345 through the second holes, the third hole and the fourth hole. Furthermore, in this state, the guide member 345 is fastened in a state of being inserted into the protruding portion 350b of the lower cover 350. Accordingly, the guide member 345 includes a sixth hole (H) corresponding to the fifth hole 350' therein. Here, a diameter of the sixth hole (H) may be smaller than that of the fifth hole 350'. Furthermore, a cylindrical shape groove 345a corresponding to a width of the protruding portion 350b is formed on the guide member 345 inserted into the protruding portion 350b of the lower cover 350.

As described above, according to the present disclosure, a cylindrical shape guide member 345 may be applicable to the hole region to insert and fix the optical sheets 343, the light guide plate 342 and the reflector 341 thereto so as to eliminate the existing rectangular frame shape, thereby a narrow bezel can be implemented in the irregular shape device of the present disclosure.

The guide member 345 may be formed of the same or similar material, for example, PMMA or PC, to that of the light guide plate 342, and the guide member 345 may be inserted into the hole to reduce a luminance difference between the front and the back of the hole. However, the present disclosure may not be necessarily limited to this, and any material may be also applicable such as a transparent material as long as it allows light to pass therethrough and reach up to a rear portion of the hole.

In other words, in the present disclosure, a cylindrical shape guide member 345 having a size smaller than that of the hole, and with the same material as that of the light guide plate 342 may be inserted into the hole (i.e., second holes, third hole and fourth hole) to transmit light up to the rear portion of the hole, thereby reducing a luminance difference between the front and the back of the hole. In other words, the guide member 345 of the present disclosure performs the role of directly transmitting light up to the rear portion of the hole without blocking a light path to improve a dark portion of the rear portion of the hole and enhance the light uniformity of the backlight unit, thereby providing improving image quality of the display.

Furthermore, a reflection sheet 349 may be located on the cylindrical shape guide member 345 to block the light leaked out through an air layer between the light guide plate 342 and the guide member 345.

The reflection sheet 349 may be formed of a reflective metal material, and placed on the optical sheets 343 by interposing a pad 347 therebetween. In other words, the pad 347 may be interposed between a reflection sheet 349 placed on the guide member 345 and the reflection sheet 349 at another side thereof and the optical sheets 343 to compensate a height difference to the guide member 345.

A multi-layered film coated with silver, aluminium or the like in addition to a metal material or a multi-layered film on which refractive index anisotropic materials are alternately deposited may be applicable to the reflection sheet 349.

The reflection sheet 349 may have a flat cylindrical shape, namely, a disk shape, and an external diameter thereof may be relatively larger than that of the guide member 345. In other words, the reflection sheet 349 may overlap one side of the optical sheets 343 around the second holes, and the pad 347 may be located at the overlapping portion.

Furthermore, an internal diameter of the reflection sheet 349 may be the same or substantially the same as an internal diameter of the guide member 345, namely, a diameter of the sixth hole (H).

The pad 347 may have a constant elasticity, and have a disk shape similar to the reflection sheet 349. An adhesive may be applied on or beneath or both on and beneath the pad 347.

On the other hand, as described above, the present disclosure may be also applicable to a circular display in which a display unit is circular, and will be described in detail through the following fourth embodiment of the present disclosure.

Figure 14:
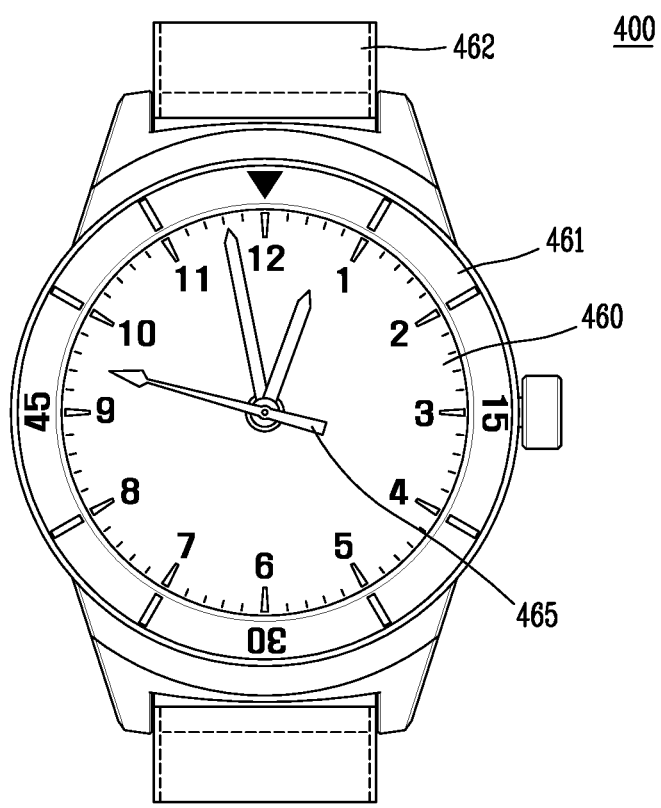
FIG. 14 is a plan view illustrating an irregular shape display according to a fourth embodiment of the present disclosure for an example.

FIG. 14 is a plan view illustrating an irregular shape display according to a fourth embodiment of the present disclosure for an example.

Figure 15:
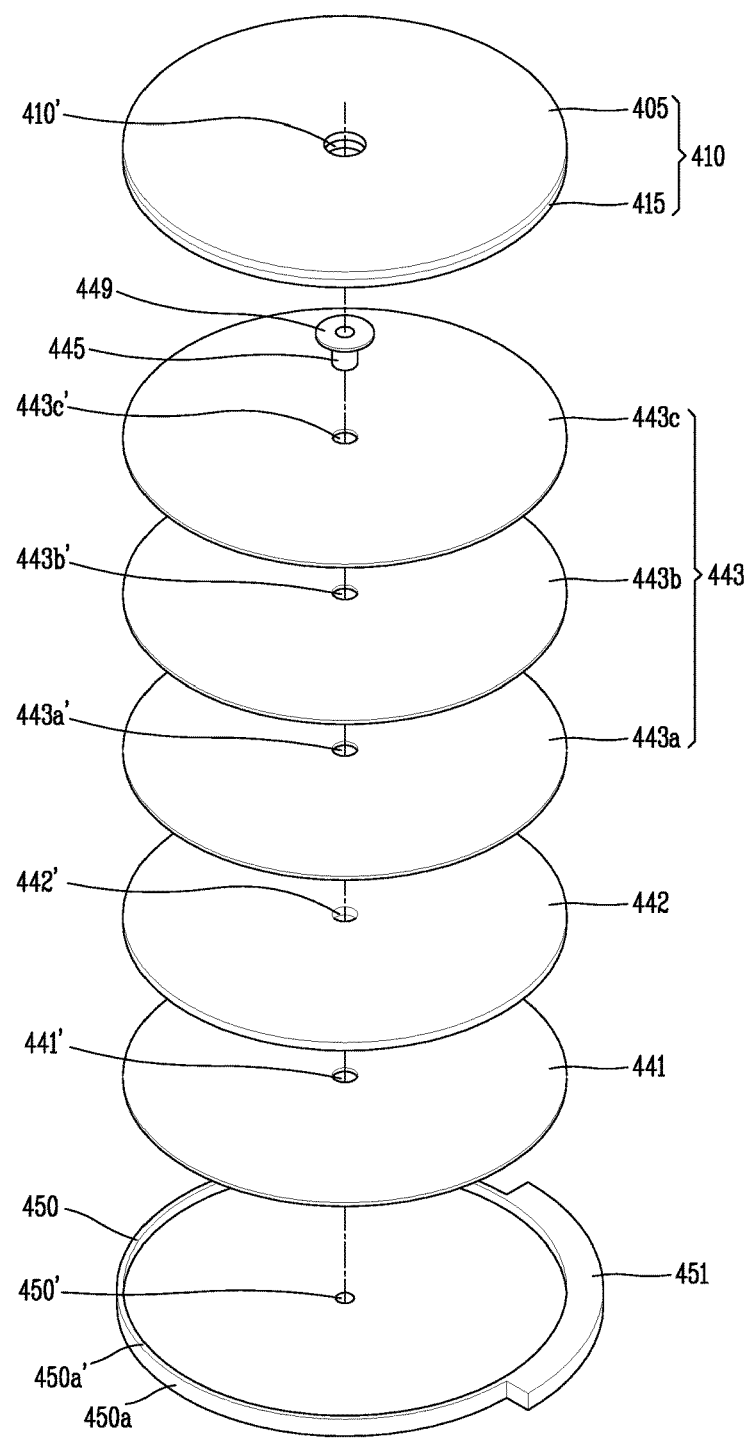
FIG. 15 is an exploded perspective view schematically illustrating the structure of the irregular shape display according to the fourth embodiment of the present disclosure illustrated in FIG. 14.

Furthermore, FIG. 15 is an exploded perspective view schematically illustrating the structure of the irregular shape display according to the fourth embodiment of the present disclosure illustrated in FIG. 14.

An irregular shape display in which a display unit is circular may be referred to as a circular display, and here the meaning of being circular may include the meaning of having a substantially circular shape.

A wearable watch to which a circular display is applied implements a real circular shape. From a TFT design to a bezel design at an outside of the display, it is designed and developed in a perfect circular shape. It has a larger screen area than that of a square display with the same size by 57%. Through this, a circular product may display the entire screen thereof, thereby enhancing user convenience, providing low thickness applications as well as allowing a touch screen function on the entire screen.

Here, a wearable watch is taken as an example for the irregular shape display according to the fourth embodiment of the present disclosure illustrated in FIGS. 14 and 15, but the present disclosure may not be necessarily limited to this.

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, improving structural and software aspects in a terminal may be taken into consideration for the functional support and enhancement of the terminal.

Owing to such an improvement, in recent years, mobile terminals have been evolved into various types of designs, and a wearable watch type mobile terminal that can be fixed to a user's body has been developed.

Referring to FIG. 14, a watch type mobile terminal 400 may include a body 461 having a display unit 460 and a band 462 connected to the body 461 to be worn on a wrist.

The body 461 may include a case forming an outer appearance. The case may include a plurality of cases provided with an internal space for accommodating various electronic components. However, the present disclosure may not be necessarily limited to this, and one case may be configured to provide an internal space to implement a mobile terminal 400 with a unibody.

The cases may be formed of a synthetic resin by using an injection-molding process. Alternatively, it may be also formed of a metal material such as stainless steel (STS), titanium (Ti) or the like.

The watch type mobile terminal 400 may be configured to perform wireless communication, and an antenna for wireless communication may be provided in the body 461. Meanwhile, the antenna may extend the performance using a case. For example, a case including a conductive material may be electrically connected to the antenna to extend a ground area or a radiation area.

The display unit 460 may be disposed in an exposed manner on one surface of the body 461.

For an example, the display unit 460 may be disposed on a front surface of the body 461 to display information, and a touch sensor may be provided on the display unit 460 to be implemented as a touch screen.

For an example, the display unit 460 implemented by a liquid crystal panel may display numerals (1 through 12) indicating a time, and a current time may be checked by indicator hands 465 including an hour hand indicating a number corresponding to the hours according to the flow of time, a minute/second hand indicating a number corresponding to the minutes/seconds according to the flow of time.

An audio output unit, a camera, a microphone, a user input unit and the like may be provided in the body 461. When the display unit 460 is implemented to have a touch screen function, it may function as a user input unit, and accordingly, an additional key may not be provided in the body 461.

The band 462 may be worn on a wrist and configured to surround the wrist, and may be formed of a flexible material to facilitate wearing thereof. For such an example, the band 462 may be formed of leather, rubber, silicon, synthetic resin material or the like. Furthermore, the band 462 may be detachably configured on the body 461, and thus exchangeable with various types of bands according to a user's taste.

On the other hand, the band 462 may be used to extend the performance of the antenna. For example, a ground extension portion electrically connected to the antenna to extend a ground area may be integrated into the band.

A fastener may be provided in the band 462. The fastener may be implemented by a buckle, a snap-fittable hook structure, a Velcro (brand name) or the like, and may include a flexible section or material.

The irregular shape display according to the fourth embodiment of the present disclosure as described above may be configured with a donut-shaped structure based on a display unit, and used for an electronic device for displaying a donut-shaped area.

For an example, the irregular shape display of the present disclosure may be applicable to a wearable watch. Here, mechanical parts such as hour, minute and second hands of the watch may be located on an upper surface of the liquid crystal panel through a hole.

In other words, the irregular shape display of the present disclosure may have a circular shaped structure as a whole, and a hole may be formed to allow a mechanical part to pass therethrough, and thus applicable to an electronic device for displaying a donut-shaped area such as a watch or the like.

Referring to FIG. 15, the irregular shape display according to the fourth embodiment of the present disclosure may include a liquid crystal panel 410 in which liquid crystals are injected between a color filter substrate 405 and an array substrate 415 to display an image, a backlight unit provided on a rear surface of the liquid crystal panel 410 to emit light over the entire surface of the liquid crystal panel 410, and a lower cover 450 configured to accommodate and fix the liquid crystal panel 410 and the backlight unit.

As described above, the liquid crystal panel 410 may include the color filter substrate 405 in which pixels are arranged in a matrix form to display an image, and bonded thereto to maintain a uniform cell gap to face each other, the array substrate 415, and the liquid crystal layer formed in the cell gap between the color filter substrate 405 and the array substrate 415.

Describing the backlight unit according to the fourth embodiment of the present disclosure in detail, a light source unit (not shown) including a light source for generating light may be provided at one side of a light guide plate 442, and a reflector 441 may be provided on a rear surface of the light guide plate 442.

Furthermore, a plurality of optical sheets 443 for enhancing an efficiency of light exited from the light guide plate 442 to irradiate on the liquid crystal panel 410 may be disposed on an upper surface of the light guide plate 442.

However, the present disclosure may not be necessarily limited to the foregoing structure of the backlight unit, and the backlight unit having any structure may be also applicable to any irregular shape display according to the present disclosure.

The light guide plate 442 receives light from the light source, and guides the light to the side of the liquid crystal panel 410.

The light guide plate 442 may be formed of a plastic such as PMMA or PC.

The reflector 441 is located between the lower cover 450 and a rear surface of the light guide plate 442. The reflector 441 performs the role of reflecting light from the light source and the light from the light guide plate 442 to the side of the liquid crystal panel 410.

Light emitted from the light source is incident to a lateral surface of the light guide plate 442 having a transparent material, and the reflector 441 disposed on a rear surface of the light guide plate 442 reflects light transmitted through the rear surface of the light guide plate 442 to the side of the optical sheets 443 on an upper surface of the light guide plate 442, thereby reducing the loss of light and enhancing the uniformity.

Here, the optical sheets 443 may include a diffusion sheet 443a and a prism sheet 443b, and a luminance enhancement film 443c such as DBEF and a protective sheet may also be added thereto.

The optical sheets 443 may be provided between an upper surface of the light guide plate 442 and a rear surface of the liquid crystal panel 410.

The backlight unit having the foregoing structure is accommodated into the lower cover 450.

The lower cover 450 may include a plurality of side portions 450a perpendicularly extended from the bottom. The side portions 450a may be extended in perpendicular thereto to a predetermined height from each edge of the lower cover 450.

The side portions 450a may include a mounting portion 450a' bent toward the center of the irregular shape display to have a predetermined width, and the liquid crystal panel 410 may be mounted on the mounting portion 450a'.

A space surrounded by the side portion 450a and the mounting portion 450a' constitutes an accommodation space in which the backlight unit is accommodated. In other words, it is seen that the side portions 450a and the mounting portion 450a' are bent in a "⊏"-shape from the bottom of the lower cover 450. Accordingly, the reflector 441, the light guide plate 442 and the optical sheets 443 are accommodated into the lower cover 450, and the light guide plate 442 and the optical sheets 443 may be fixed to an inner portion of the lower cover 450 by the side portions 450a and the mounting portion 450a' of the lower cover 450 bent in a "⊏"-shape.

Here, an accommodation groove 451 in which a plurality of light sources and the flexible printed circuit board are accommodated may be formed at one side of the inner portion of the lower cover 450 corresponding to the light source unit.

In the irregular shape display according to the fourth embodiment of the present disclosure having the foregoing configuration, the liquid crystal panel 410 may have an irregular shape display, for example, a circular shape corresponding to an outer shape of the wearable watch, based on a display surface thereof. In addition, the mechanism and optical components of the backlight unit, namely, the optical sheets 443, the light guide plate 442, the reflector 441 and the lower cover 450, may have a circular shape corresponding to an outer shape of the irregular shape display as a whole. However, the present disclosure may not be necessarily limited to this.

Furthermore, as described above, a first hole 410', second holes 443a', 443b', 443c', a third hole 442', a fourth hole 441' and a fifth hole 450' with a circular shape may be formed at the center of the liquid crystal panel 410, the optical sheets 443, the light guide plate 442, the reflector 431 and the lower cover 450. However, the present disclosure may not be necessarily limited to this configuration.

When the irregular shape display is applied to the wearable watch, the first hole 410', the second holes 443a', 443b', 443c', the third hole 442', the fourth hole 441' and the fifth hole 450' may be holes through which indicator hands such as hour, minute and second hands, and the like passes.

The liquid crystal panel 410 may display an image in a region except for the first hole 410' during actual display.

For an example, the first hole 410' may have a diameter larger than that of the second holes 443a', 443b', 443c', the third hole 442' and the fourth hole 441', and the second holes 443a', 443b', 443c', the third hole 442' and the fourth hole 441' may have a diameter larger than that of the fifth hole 450'.

As described above, the circular-shaped fifth hole 450' may be formed at the center of the lower cover 450. Here, a guide member 445 inserted through the second holes 443a', 443b', 443c', the third hole 442' and the fourth hole 441' may be located at an edge of the lower cover 450 around the fifth hole 450'.

A lateral surface respectively corresponding to the second holes 443a', 443b', 443c', the third hole 442' and the fourth hole 441' of the optical sheets 443a, 443b, 443c, the light guide plate 442 and the reflector 441 may be brought into contact with a lateral surface of the guide member 445, or located in the vicinity thereof. In other words, the guide member 445 may respectively pass through the second holes 443a', 443b', 443c', the third hole 442' and the fourth hole 441' of the optical sheets 443a, 443b, 443c, the light guide plate 442 and the reflector 441 to accommodate the optical sheets 443a, 443b, 443c, the light guide plate 442 and the reflector 441 into the lower cover 450.

Here, similar to the foregoing first through third embodiments of the present disclosure, the guide member 445 according to the fourth embodiment of the present disclosure may have a cylindrical shape similar to the hole, and particularly, may be partially inserted and provided only into the left and right holes while performing the role of the existing guide panel.

The guide member 445 may be formed of the same or similar material, for example, PMMA or PC, to that of the light guide plate 442, and the guide member 445 may be inserted into the hole to reduce a luminance difference between the front and the back of the hole. However, the present disclosure may not be necessarily limited to this, and any material may be also applicable such as a transparent material as long as it allows light to pass therethrough and reach up to a rear portion of the hole.

Furthermore, a reflection sheet 449 may be located on the cylinder-shaped guide member 445 to perform the role of blocking light leaked out through an air layer between the light guide plate 442 and the guide member 445.

The reflection sheet 449 may be formed of a reflective metal material, and placed on the optical sheets 443 by interposing a pad 447 therebetween. In other words, the pad 447 may be interposed between a reflection sheet 449 placed on the guide member 445 and the reflection sheet 449 at another side thereof and the optical sheets 443 to compensate a height difference with respect to the guide member 445.

A multi-layered film coated with silver, aluminium or the like in addition to a metal material or a multi-layered film on which refractive index anisotropic materials are alternately deposited may be applicable to the reflection sheet 449.

The reflection sheet 449 may have a flat cylindrical shape, namely, a disk shape, and an external diameter thereof may be relatively larger than that of the guide member 445. In other words, the reflection sheet 449 may overlap one side of the optical sheets 443 around the second holes 443a', 443b', 443c', and the pad 447 may be located at the overlapping portion.

Furthermore, an internal diameter of the reflection sheet 449 may be the same or substantially the same as an internal diameter of the guide member 445, namely, a diameter of the sixth hole (H).

The pad 447 may have a constant elasticity, and have a disk shape similar to the reflection sheet 449. An adhesive may be applied on or beneath or both on and beneath the pad 447.

Although many subject matters have been specifically disclosed in the foregoing description, they should be construed as an illustration of embodiments rather than a limitation to the scope of disclosure. Consequently, the disclosure should not be determined by the embodiments disclosed herein but should be determined by the claims and the equivalents thereof.

What is claimed is:

1. An irregular shape display, comprising:
    a liquid crystal panel displaying an image;
    a backlight unit located at a lower portion of the liquid crystal panel;
    a lower cover configured to accommodate the liquid crystal panel and the backlight unit, wherein each of the liquid crystal panel and the lower cover has at least one hole provided in a predetermined region to allow a mechanical part to pass through;
    a cylindrical shape guide member inserted into the at least one hole;
    a disk shape reflection sheet disposed on the cylindrical shape guide member, wherein the liquid crystal panel is located above the disk shape reflection sheet, and the disk shape reflection sheet is located between the liquid crystal panel and the backlight unit.

2. The irregular shape display of claim 1, wherein the backlight unit comprises:
    a light source located at one side of a light guide plate to generate light;
    a reflector disposed on a rear surface of the light guide plate; and
    a plurality of optical sheets disposed on an upper surface of the light guide plate.

3. The irregular shape display of claim 2, wherein the liquid crystal panel, the optical sheets, the light guide plate, the reflector and the lower cover have an outer edge shape of a curve or a polygon, or a mixed shape of a curve and a polygon.

4. The irregular shape display of claim 2, wherein the guide member is formed of the same material as that of the light guide plate, and is inserted into the hole to transmit light to a rear portion of the hole, wherein the rear portion is located at an opposite direction with respect to a light emission direction from the light source.

5. The irregular shape display of claim 2, wherein the at least one hole comprises:
    a first hole provided at the liquid crystal panel;
    second holes provided at the optical sheets;
    a third hole provided at the light guide plate;
    a fourth hole provided at the reflector; and
    a fifth hole provided at the lower cover.

6. The irregular shape display of claim 5, wherein the first, second, third, fourth, and fifth holes have a curved shape or a polygonal shape, or have a mixed shape of a curve and a polygon.

7. The irregular shape display of claim 5, wherein the first hole has a diameter larger than that of the second holes, the third hole and the fourth hole, and the second holes, the third hole and the fourth hole have a diameter larger than that of the fifth hole.

8. The irregular shape display of claim 5, wherein the guide member is located at an upper edge portion of the lower cover around the fifth hole and passes through the second holes, the third hole and the fourth hole.

9. The irregular shape display of claim 5, wherein the disk shape reflection sheet and the liquid crystal panel do not vertically overlap each other.

10. The irregular shape display of claim 9, wherein the reflection sheet is formed of a multi-layered film coated with a reflective metal material including silver and aluminium.

11. The irregular shape display of claim 9, wherein the reflection sheet is placed at an upper edge portion of the optical sheets around the second holes.

12. The irregular shape display of claim 11, further comprising a pad between the reflection sheet and the optical sheets.

13. The irregular shape display of claim 12, wherein the reflection sheet has an external diameter larger than that of the guide member, and overlaps an edge of the optical sheets around the second holes, and the pad is located at the overlapping portion.

14. The irregular shape display of claim 9, wherein a diameter of the first hole is smaller than an external diameter of the reflection sheet such that the liquid crystal panel is mounted on the reflection sheet.

15. The irregular shape display of claim 5, wherein the lower cover comprises a protruding portion protruded from an edge of the fifth hole to a direction of the liquid crystal panel, and the guide member inserted through the second holes, the third hole and the fourth holes is fastened to the protruding portion.

16. The irregular shape display of claim 1, wherein the liquid crystal panel displays the image in a region except for the hole.

17. The irregular shape display of claim 1, wherein a lateral edge of the liquid crystal panel is sealed with a sealing material through side sealing.

18. A display device having a non-tetragonal shape, comprising:
    a display panel displaying an image and having a first hole;
    a lower cover having a second hole;
    a cylindrical shape guide member positioned through the first and second holes and engaged with the lower cover; and
    a disk shape reflection sheet on the guide member, wherein the display panel is located above the disk shape reflection sheet,
    wherein a backlight unit is located at a lower portion of the liquid crystal panel and the disk shape reflection sheet is located between the liquid crystal panel and the backlight unit.

19. The display device of claim 18, further comprising a pad located below a portion of the external diameter of the reflection sheet larger than that of the guide member.

20. The display device of claim 18, wherein the lower cover has a cylindrical shape protrusion surrounding the second hole toward the display panel and the guide member has a cylindrical shape groove to engage the cylindrical shape guide member.

21. An irregular shape display, comprising:
    a liquid crystal panel displaying an image;

a backlight unit located at a lower portion of the liquid crystal panel;

a lower cover configured to accommodate the liquid crystal panel and the backlight unit, wherein each of the liquid crystal panel and the lower cover has at least one hole provided in a predetermined region to allow a mechanical part to pass through;

a cylindrical shape guide member inserted into the at least one hole; and a reflection sheet disposed on the cylindrical shape guide member and not vertically overlapping the liquid crystal panel, wherein the cylindrical shape guide member is formed of a transparent material that allows light to pass therethrough.

22. An irregular shape display, comprising:

a liquid crystal panel displaying an image;

a backlight unit located at a lower portion of the liquid crystal panel;

a lower cover configured to accommodate the liquid crystal panel and the backlight unit, wherein each of the liquid crystal panel and the lower cover has at least one hole provided in a predetermined region to allow a mechanical part to pass through; and a cylindrical shape guide member inserted into the at least one hole, wherein the liquid crystal panel is located above a top surface of the cylindrical shape guide member, and the top surface of the cylindrical shape guide member is located between the liquid crystal panel and the backlight unit.

* * * * *